US012561082B2

(12) United States Patent
Panakkal et al.

(10) Patent No.: US 12,561,082 B2
(45) Date of Patent: Feb. 24, 2026

(54) BLOCK DATA ENCRYPTION OF NON-VOLATILE MEMORY THROUGH SELECTIVE SELECT GATE ERASE THROUGH CHARGE COUPLED SCHEME

(71) Applicant: Sandisk Technologies, Inc., Milpitas, CA (US)

(72) Inventors: Binoy Jose Panakkal, Kochi (IN); Gopu S, Kollam (IN)

(73) Assignee: Sandisk Technologies, Inc., Milpitas, CA (US)

( * ) Notice: Subject to any disclaimer, the term of this patent is extended or adjusted under 35 U.S.C. 154(b) by 207 days.

(21) Appl. No.: 18/463,525

(22) Filed: Sep. 8, 2023

(65) Prior Publication Data
US 2025/0085882 A1    Mar. 13, 2025

(51) Int. Cl.
*G11C 16/04*    (2006.01)
*G06F 3/06*    (2006.01)
*G06F 11/10*    (2006.01)

(52) U.S. Cl.
CPC .......... *G06F 3/0652* (2013.01); *G06F 3/0619* (2013.01); *G06F 3/0679* (2013.01); *G06F 11/1008* (2013.01)

(58) Field of Classification Search
CPC .... G06F 3/0652; G06F 3/0619; G06F 3/0679; G06F 11/1008
See application file for complete search history.

(56) References Cited

U.S. PATENT DOCUMENTS

| | | | |
|---|---|---|---|
| 9,142,304 B2 | 9/2015 | Costa et al. | |
| 10,566,059 B2 | 2/2020 | Diep et al. | |
| 10,839,914 B2 | 11/2020 | Shen et al. | |
| 11,551,765 B2 | 1/2023 | Yang et al. | |
| 2020/0244458 A1* | 7/2020 | Kanbe ................... | G06F 3/0637 |
| 2022/0045850 A1* | 2/2022 | Ejiri ...................... | H04L 9/0643 |
| 2022/0406384 A1 | 12/2022 | Nakazawa | |
| 2023/0344623 A1* | 10/2023 | Kanbe .................... | H04L 9/321 |

* cited by examiner

*Primary Examiner* — Pho M Luu
(74) *Attorney, Agent, or Firm* — Pearl Cohen Zedek Latzer Baratz LLP

(57) ABSTRACT

To allow for the erase of the drain side select gates of NAND strings while maintaining the data content of the memory cells, while erase inhibiting the memory cells of a NAND string, holes are generated in the drain region through the gate induced drain leakage (GIDL) mechanism and transferred to under the select gate, where they are then used to erase the select gate by Fowler-Nordheim mechanism. This allows for the refresh of the drain side select gates while retaining the data content of the NAND strings. This approach can also be used for data encryption, since, by erasing the drain side select gates, a block of data can be rendered unreadable; but, since the data content is not erased, it can later be recovered.

20 Claims, 26 Drawing Sheets

Figure 10A

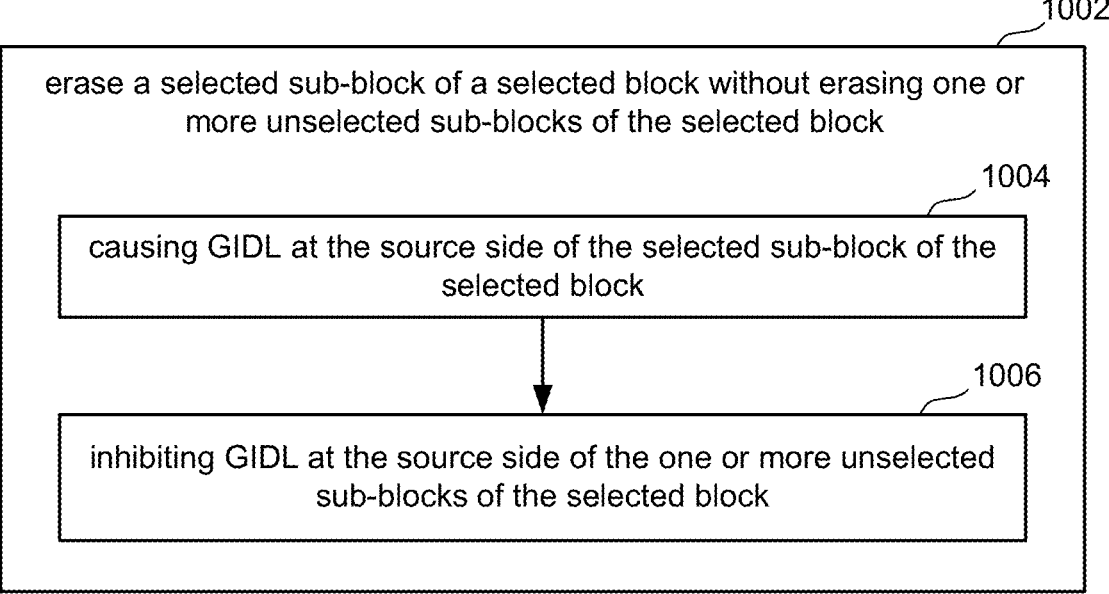

1002 erase a selected sub-block of a selected block without erasing one or more unselected sub-blocks of the selected block

1004 causing GIDL at the source side of the selected sub-block of the selected block

1006 inhibiting GIDL at the source side of the one or more unselected sub-blocks of the selected block

Figure 10B

1050 applying an erase voltage to the source line and the bit lines

1052 applying a GIDL enable voltage to source side GIDL generation transistors and bit line side GIDL generation transistors in a selected sub-block of a selected block

1054 applying a GIDL inhibit voltage to source side GIDL generation transistors and bit line side GIDL generation transistors in the one or more unselected sub-blocks of the selected block such that memory cells of the selected sub-block of the selected block experience GIDL based erasing due to GIDL generation by the source side GIDL generation transistors and bit line side GIDL generation transistors in the selected sub-block of the selected block while memory cells in the one or more unselected sub-blocks of the selected block are inhibited from GIDL based erasing

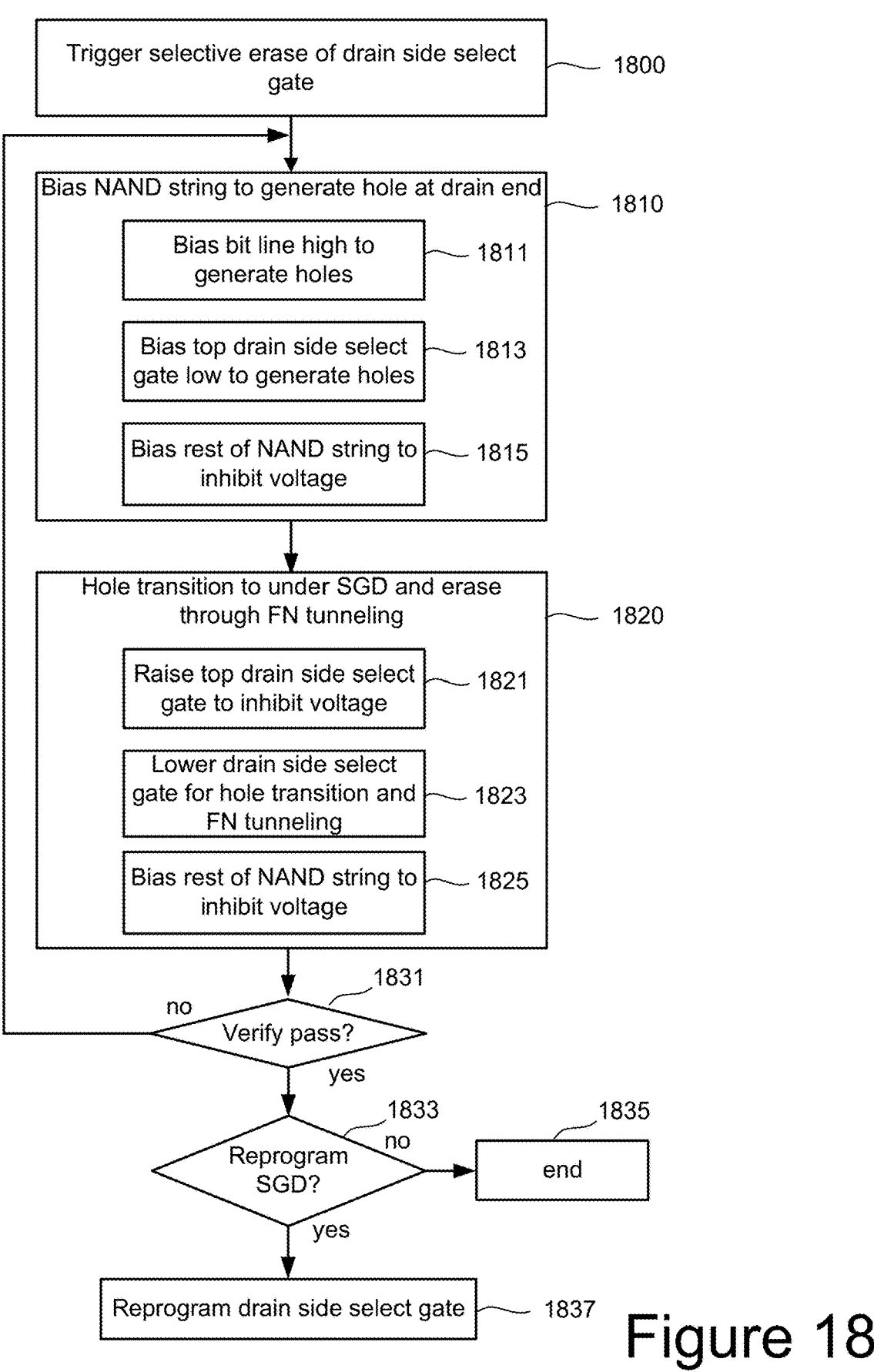

Trigger selective erase of drain side select gate — 1800

Bias NAND string to generate hole at drain end — 1810

Bias bit line high to generate holes — 1811

Bias top drain side select gate low to generate holes — 1813

Bias rest of NAND string to inhibit voltage — 1815

Hole transition to under SGD and erase through FN tunneling — 1820

Raise top drain side select gate to inhibit voltage — 1821

Lower drain side select gate for hole transition and FN tunneling — 1823

Bias rest of NAND string to inhibit voltage — 1825

1831 no

Verify pass?

yes

1833

Reprogram SGD?    no → end    1835 yes

Reprogram drain side select gate — 1837

Figure 18

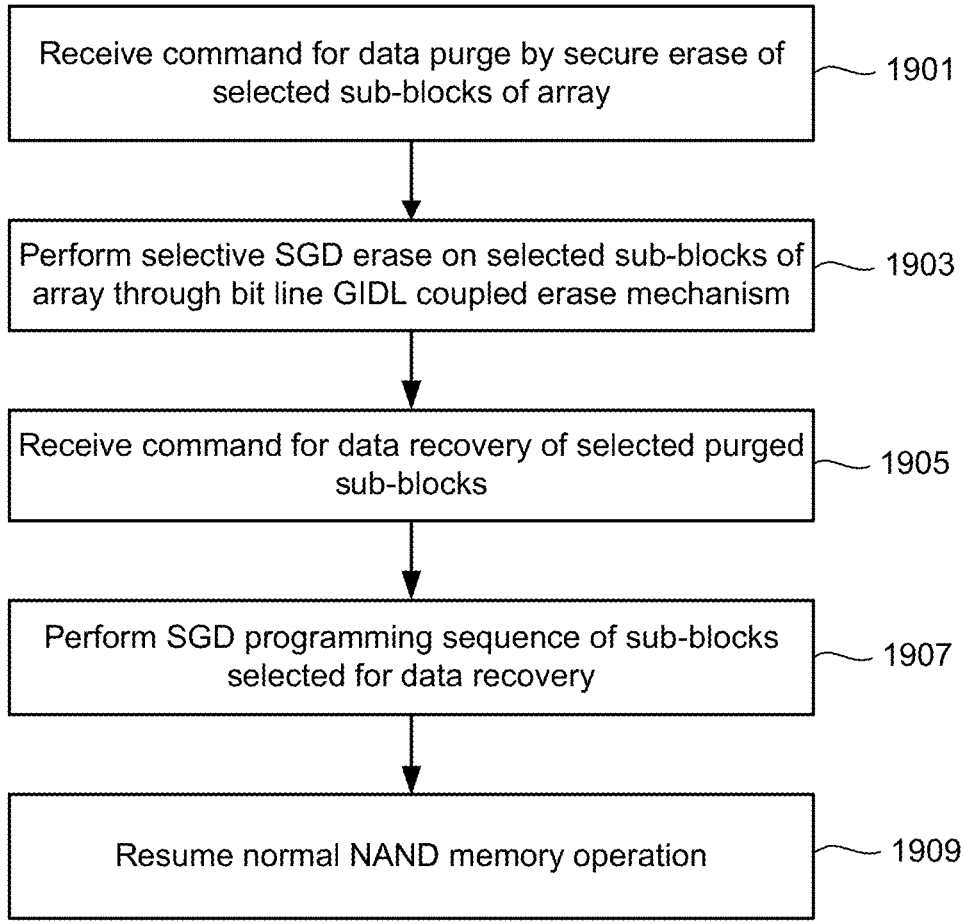

Receive command for data purge by secure erase of selected sub-blocks of array ～ 1901

Perform selective SGD erase on selected sub-blocks of array through bit line GIDL coupled erase mechanism ～ 1903

Receive command for data recovery of selected purged sub-blocks ～ 1905

Perform SGD programming sequence of sub-blocks selected for data recovery ～ 1907

Resume normal NAND memory operation ～ 1909

Figure 19

BLOCK DATA ENCRYPTION OF NON-VOLATILE MEMORY THROUGH SELECTIVE SELECT GATE ERASE THROUGH CHARGE COUPLED SCHEME

BACKGROUND

The present disclosure relates to non-volatile storage.

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. Non-volatile memory allows information to be stored and retained even when the non-volatile memory is not connected to a source of power (e.g., a battery). One example of non-volatile memory is flash memory (e.g., NAND-type and NOR-type flash memory).

Users of non-volatile memory can program (e.g., write) data to the non-volatile memory and later read that data back. For example, a digital camera may take a photograph and store the photograph in non-volatile memory. Later, a user of the digital camera may view the photograph by having the digital camera read the photograph from the non-volatile memory.

BRIEF DESCRIPTION OF THE DRAWINGS

Like-numbered elements refer to common components in the different figures.

FIG. 10A is a flow chart describing one embodiment of a process performed during erasing of non-volatile memory.

FIG. 10B is a flow chart describing one embodiment of a process performed during erasing of non-volatile memory.

FIG. 18 is a flowchart for an embodiment for selective drain side select gate erasure through the GIDL based charge coupled scheme.

FIG. 19 is a flowchart of an embodiment for data purge and retrieval base on the drain side select gate selective erase mechanism.

DETAILED DESCRIPTION

In non-volatile NAND memory, the memory cells are connected in series between select gates. For some NAND memory architectures, the select gates can have programmable threshold voltages. These programmable select gates are initially programmed to a threshold voltage and, although these select gates are not typically erased and programmed during the standard memory operations, the threshold voltages of the select gates can drift over time due to the read, write, and erase operations carried out on the memory cells. Because of this, it can be useful to refresh the select gates by erasing and reprogramming the select gates so that their threshold voltage are in the desired range. However, to erase the select gates usually also requires the erase of the data content of the memory cells of the NAND structure.

To avoid this problem, the following presents techniques that allow for the erase of the drain side select gates of NAND strings while maintaining the data content of the memory cells. While erase inhibiting the memory cells of a NAND string, holes are generated in the drain region through the gate induced drain leakage (GIDL) mechanism and are transferred to under the select gate, where they are then used to erase the select gate by the Fowler-Nordheim mechanism. This allows for the refresh of the drain side select gates while retaining the data content of the NAND strings. This technique can also be used for data encryption, since, by selectively erasing the drain side select gates while not erasing the memory cells, a block of data can be rendered unreadable; but, since the data content is not erased, it can later be recovered.

Figure 1:
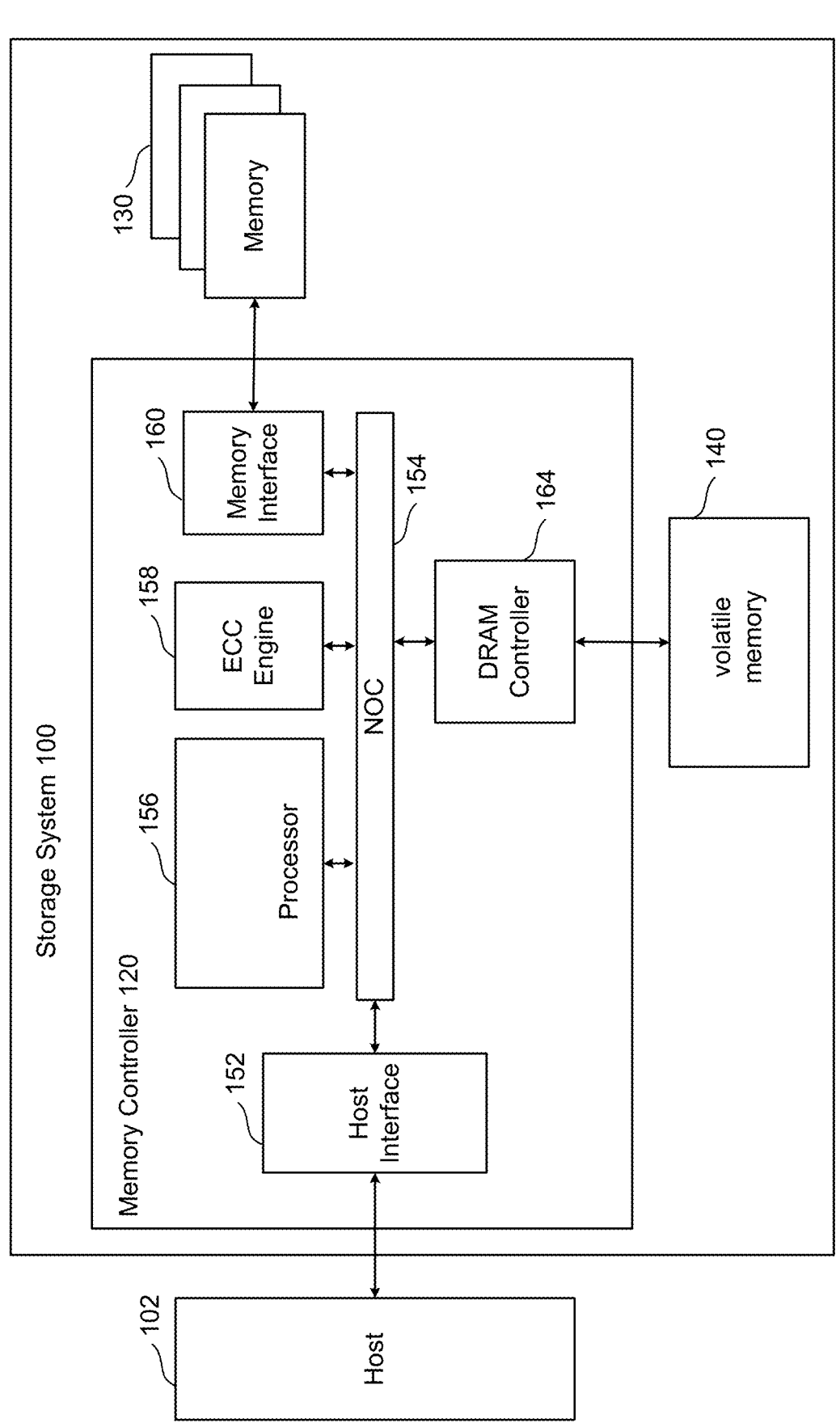
FIG. 1 is a block diagram depicting one embodiment of a storage system.

FIG. 1 is a block diagram of one embodiment of a storage system 100 that implements the proposed technology described herein. In one embodiment, storage system 100 is a solid state drive ("SSD"). Storage system 100 can also be a memory card, USB drive or other type of storage system. The proposed technology is not limited to any one type of memory system. Storage system 100 is connected to host 102, which can be a computer, server, electronic device (e.g., smart phone, tablet or other mobile device), appliance, or another apparatus that uses memory and has data processing capabilities. In some embodiments, host 102 is separate from, but connected to, storage system 100. In other embodiments, storage system 100 is embedded within host 102.

The components of storage system 100 depicted in FIG. 1 are electrical circuits. Storage system 100 includes a memory controller 120 connected to non-volatile memory 130 and local high speed volatile memory 140 (e.g., DRAM). Local high speed volatile memory 140 is used by memory controller 120 to perform certain functions. For example, local high speed volatile memory 140 stores logical to physical address translation tables ("L2P tables").

Memory controller 120 comprises a host interface 152 that is connected to and in communication with host 102. In one embodiment, host interface 152 implements an NVM Express (NVMe) over PCI Express (PCIe). Other interfaces can also be used, such as SCSI, SATA, etc. Host interface 152 is also connected to a network-on-chip (NOC) 154. A NOC is a communication subsystem on an integrated circuit. NOC's can span synchronous and asynchronous clock domains or use unclocked asynchronous logic. NOC technology applies networking theory and methods to on-chip communications and brings notable improvements over conventional bus and crossbar interconnections. NOC improves the scalability of systems on a chip (SoC) and the power efficiency of complex SoCs compared to other designs. The wires and the links of the NOC are shared by many signals. A high level of parallelism is achieved because all links in the NOC can operate simultaneously on different data packets. Therefore, as the complexity of integrated subsystems keep growing, a NOC provides enhanced performance (such as throughput) and scalability in comparison with previous communication architectures (e.g., dedicated point-to-point signal wires, shared buses, or segmented buses with bridges). In other embodiments, NOC 154 can be replaced by a bus. Connected to and in communication with NOC 154 is processor 156, ECC engine 158, memory interface 160, and DRAM controller 164. DRAM controller 164 is used to operate and communicate with local high speed volatile memory 140 (e.g., DRAM). In other embodiments, local high speed volatile memory 140 can be SRAM or another type of volatile memory.

ECC engine 158 performs error correction services. For example, ECC engine 158 performs data encoding and decoding, as per the implemented ECC technique. In one embodiment, ECC engine 158 is an electrical circuit programmed by software. For example, ECC engine 158 can be a processor that can be programmed. In other embodiments, ECC engine 158 is a custom and dedicated hardware circuit without any software. In another embodiment, the function of ECC engine 158 is implemented by processor 156.

Processor 156 performs the various controller memory operations, such as programming, erasing, reading, and memory management processes. In one embodiment, processor 156 is programmed by firmware. In other embodiments, processor 156 is a custom and dedicated hardware circuit without any software. Processor 156 also implements a translation module, as a software/firmware process or as a dedicated hardware circuit. In many systems, the non-volatile memory is addressed internally to the storage system using physical addresses associated with the one or more memory die. However, the host system will use logical addresses to address the various memory locations. This enables the host to assign data to consecutive logical addresses, while the storage system is free to store the data as it wishes among the locations of the one or more memory die. To implement this system, memory controller 120 (e.g., the translation module) performs address translation between the logical addresses used by the host and the physical addresses used by the memory dies. One example implementation is to maintain tables (i.e., the L2P tables mentioned above) that identify the current translation between logical addresses and physical addresses. An entry in the L2P table may include an identification of a logical address and corresponding physical address. Although logical address to physical address tables (or L2P tables) include the word "tables" they need not literally be tables. Rather, the logical address to physical address tables (or L2P tables) can be any type of data structure. In some examples, the memory space of a storage system is so large that the local memory 140 cannot hold all of the L2P tables. In such a case, the entire set of L2P tables are stored in a memory die 130 and a subset of the L2P tables are cached (L2P cache) in the local high speed volatile memory 140.

Memory interface 160 communicates with non-volatile memory 130. In one embodiment, memory interface provides a Toggle Mode interface. Other interfaces can also be used. In some example implementations, memory interface 160 (or another portion of controller 120) implements a scheduler and buffer for transmitting data to and receiving data from one or more memory die.

Figure 2A:
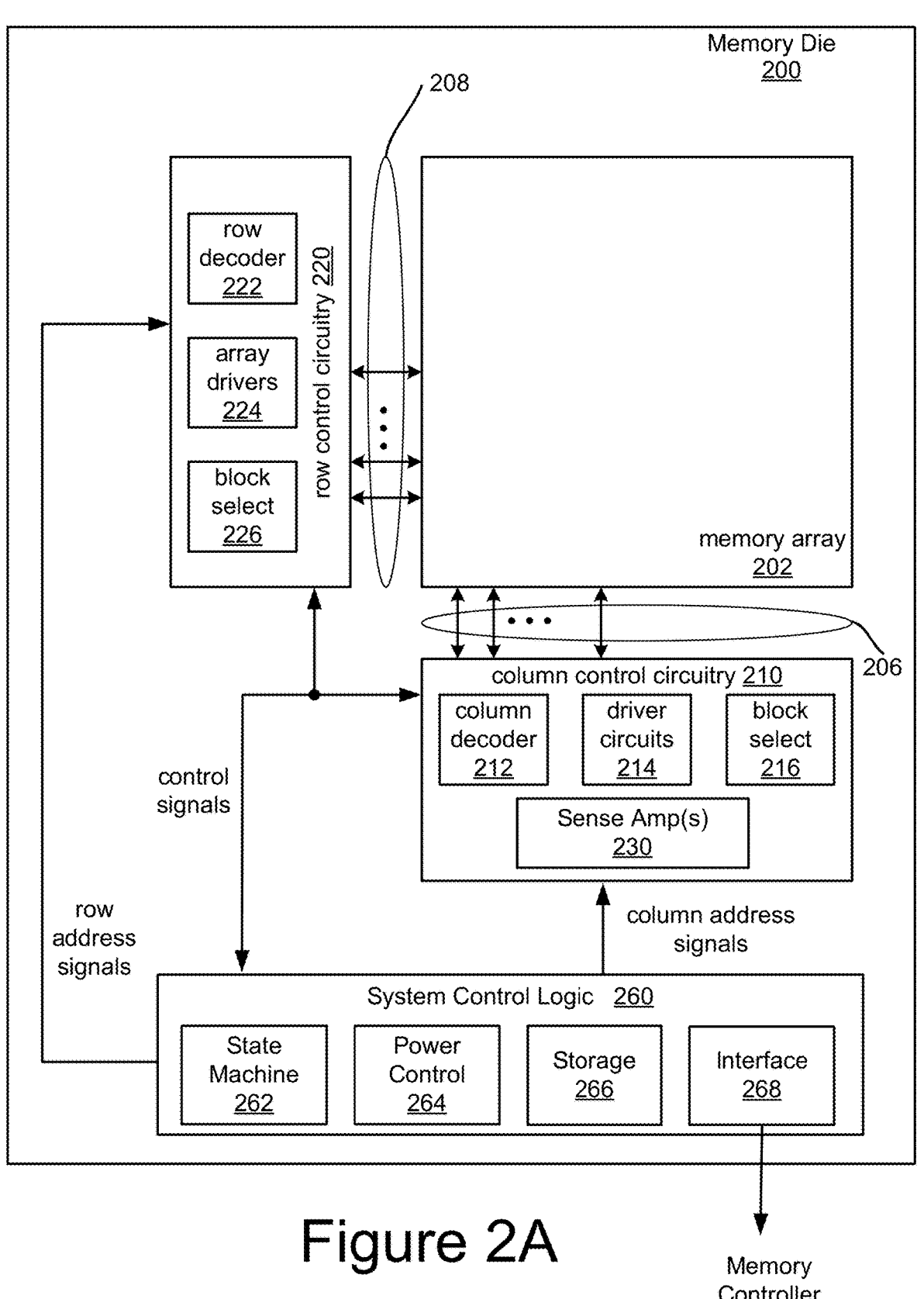
FIG. 2A is a block diagram of one embodiment of a memory die.

In one embodiment, non-volatile memory 130 comprises one or more memory die. FIG. 2A is a functional block diagram of one embodiment of a memory die 200 that comprises non-volatile memory 130. Each of the one or more memory die of non-volatile memory 130 can be implemented as memory die 200 of FIG. 2A. The components depicted in FIG. 2A are electrical circuits. Memory die 200 includes a memory array 202 that can comprises non-volatile memory cells, as described in more detail below. The array terminal lines of memory array 202 include the various layer(s) of word lines organized as rows, and the various layer(s) of bit lines organized as columns. However, other orientations can also be implemented. Memory die 200 includes row control circuitry 220, whose outputs 208 are connected to respective word lines of the memory array 202. Row control circuitry 220 receives a group of M row address signals and one or more various control signals from System Control Logic circuit 260, and typically may include such circuits as row decoders 222, array terminal drivers 224, and block select circuitry 226 for both reading and writing (programming) operations. Row control circuitry 220 may also include read/write circuitry. Memory die 200 also includes column control circuitry 210 including sense amplifier(s) 230 whose input/outputs 206 are connected to respective bit lines of the memory array 202. Although only single block is shown for array 202, a memory die can include multiple arrays that can be individually accessed. Column control circuitry 210 receives a group of N column address signals and one or more various control signals from System Control Logic 260, and typically may include such circuits as column decoders 212, array terminal receivers or driver circuits 214, block select circuitry 216, as well as read/write circuitry, and I/O multiplexers.

System control logic 260 receives data and commands from memory controller 120 and provides output data and status to the host. In some embodiments, the system control logic 260 (which comprises one or more electrical circuits) include state machine 262 that provides die-level control of memory operations. In one embodiment, the state machine 262 is programmable by software. In other embodiments, the state machine 262 does not use software and is completely implemented in hardware (e.g., electrical circuits). In another embodiment, the state machine 262 is replaced by a micro-controller or microprocessor, either on or off the memory chip. System control logic 262 can also include a power control module 264 that controls the power and voltages supplied to the rows and columns of the memory structure 202 during memory operations and may include charge pumps and regulator circuit for creating regulating voltages. System control logic 262 includes storage 366 (e.g., RAM, registers, latches, etc.), which may be used to store parameters for operating the memory array 202.

Commands and data are transferred between memory controller 120 and memory die 200 via memory controller interface 268 (also referred to as a "communication interface"). Memory controller interface 268 is an electrical interface for communicating with memory controller 120. Examples of memory controller interface 268 include a Toggle Mode Interface and an Open NAND Flash Interface (ONFI). Other I/O interfaces can also be used.

In some embodiments, all the elements of memory die 200, including the system control logic 260, can be formed as part of a single die. In other embodiments, some or all of the system control logic 260 can be formed on a different die.

In one embodiment, memory structure 202 comprises a three-dimensional memory array of non-volatile memory cells in which multiple memory levels are formed above a single substrate, such as a wafer. The memory structure may comprise any type of non-volatile memory that are monolithically formed in one or more physical levels of memory cells having an active area disposed above a silicon (or other type of) substrate. In one example, the non-volatile memory cells comprise vertical NAND strings with charge-trapping layers.

In another embodiment, memory structure 302 comprises a two-dimensional memory array of non-volatile memory cells. In one example, the non-volatile memory cells are NAND flash memory cells utilizing floating gates. Other types of memory cells (e.g., NOR-type flash memory) can also be used.

The exact type of memory array architecture or memory cell included in memory structure 202 is not limited to the examples above. Many different types of memory array architectures or memory technologies can be used to form memory structure 202. No particular non-volatile memory technology is required for purposes of the new claimed embodiments proposed herein. Other examples of suitable technologies for memory cells of the memory structure 202 include ReRAM memories (resistive random access memories), magnetoresistive memory (e.g., MRAM, Spin Transfer Torque MRAM, Spin Orbit Torque MRAM), FeRAM, phase change memory (e.g., PCM), and the like. Examples of suitable technologies for memory cell architectures of the memory structure 202 include two dimensional arrays, three dimensional arrays, cross-point arrays, stacked two dimensional arrays, vertical bit line arrays, and the like.

One example of a ReRAM cross-point memory includes reversible resistance-switching elements arranged in cross-point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Another example is magnetoresistive random access memory (MRAM) that stores data by magnetic storage elements. The elements are formed from two ferromagnetic layers, each of which can hold a magnetization, separated by a thin insulating layer. One of the two layers is a permanent magnet set to a particular polarity; the other layer's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created. MRAM based memory embodiments will be discussed in more detail below.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. In other PCM embodiments, the memory cells are programmed by current pulses. Note that the use of "pulse" in this document does not require a square pulse but includes a (continuous or non-continuous) vibration or burst of sound, current, voltage light, or another wave. These memory elements within the individual selectable memory cells, or bits, may include a further series element that is a selector, such as an ovonic threshold switch or metal insulator substrate.

A person of ordinary skill in the art will recognize that the technology described herein is not limited to a single specific memory structure, memory construction or material composition, but covers many relevant memory structures within the spirit and scope of the technology as described herein and as understood by one of ordinary skill in the art.

The elements of FIG. 2A can be grouped into two parts: (1) memory structure 202 and (2) peripheral circuitry, which includes all of the other components depicted in FIG. 2A. An important characteristic of a memory circuit is its capacity, which can be increased by increasing the area of the memory die of storage system 100 that is given over to the memory structure 202; however, this reduces the area of the memory die available for the peripheral circuitry. This can place quite severe restrictions on these elements of the peripheral circuitry. For example, the need to fit sense amplifier circuits within the available area can be a significant restriction on sense amplifier design architectures. With respect to the system control logic 260, reduced availability of area can limit the available functionalities that can be implemented on-chip. Consequently, a basic trade-off in the design of a memory die for the storage system 100 is the amount of area to devote to the memory structure 202 and the amount of area to devote to the peripheral circuitry.

Another area in which the memory structure 202 and the peripheral circuitry are often at odds is in the processing involved in forming these regions, since these regions often involve differing processing technologies and the trade-off in having differing technologies on a single die. For example, when the memory structure 202 is NAND flash, this is an NMOS structure, while the peripheral circuitry is often CMOS based. For example, elements such sense amplifier circuits, charge pumps, logic elements in a state machine, and other peripheral circuitry in system control logic 260 often employ PMOS devices. Processing operations for manufacturing a CMOS die will differ in many aspects from the processing operations optimized for an NMOS flash NAND memory or other memory cell technologies.

To improve upon these limitations, embodiments described below can separate the elements of FIG. 2A onto separately formed dies that are then bonded together. More specifically, the memory structure 202 can be formed on one die (referred to as the memory die) and some or all of the peripheral circuitry elements, including one or more control circuits, can be formed on a separate die (referred to as the control die). For example, a memory die can be formed of just the memory elements, such as the array of memory cells of flash NAND memory, MRAM memory, PCM memory, ReRAM memory, or other memory type. Some or all of the peripheral circuitry, even including elements such as decoders and sense amplifiers, can then be moved on to a separate control die. This allows each of the memory die to be optimized individually according to its technology. For example, a NAND memory die can be optimized for an NMOS based memory array structure, without worrying about the CMOS elements that have now been moved onto a control die that can be optimized for CMOS processing. This allows more space for the peripheral elements, which can now incorporate additional capabilities that could not be readily incorporated were they restricted to the margins of the same die holding the memory cell array. The two die can then be bonded together in a bonded multi-die memory circuit, with the array on the one die connected to the periphery elements on the other die. Although the following will focus on a bonded memory circuit of one memory die and one control die, other embodiments can use more die, such as two memory die and one control die, for example.

Figure 2B:
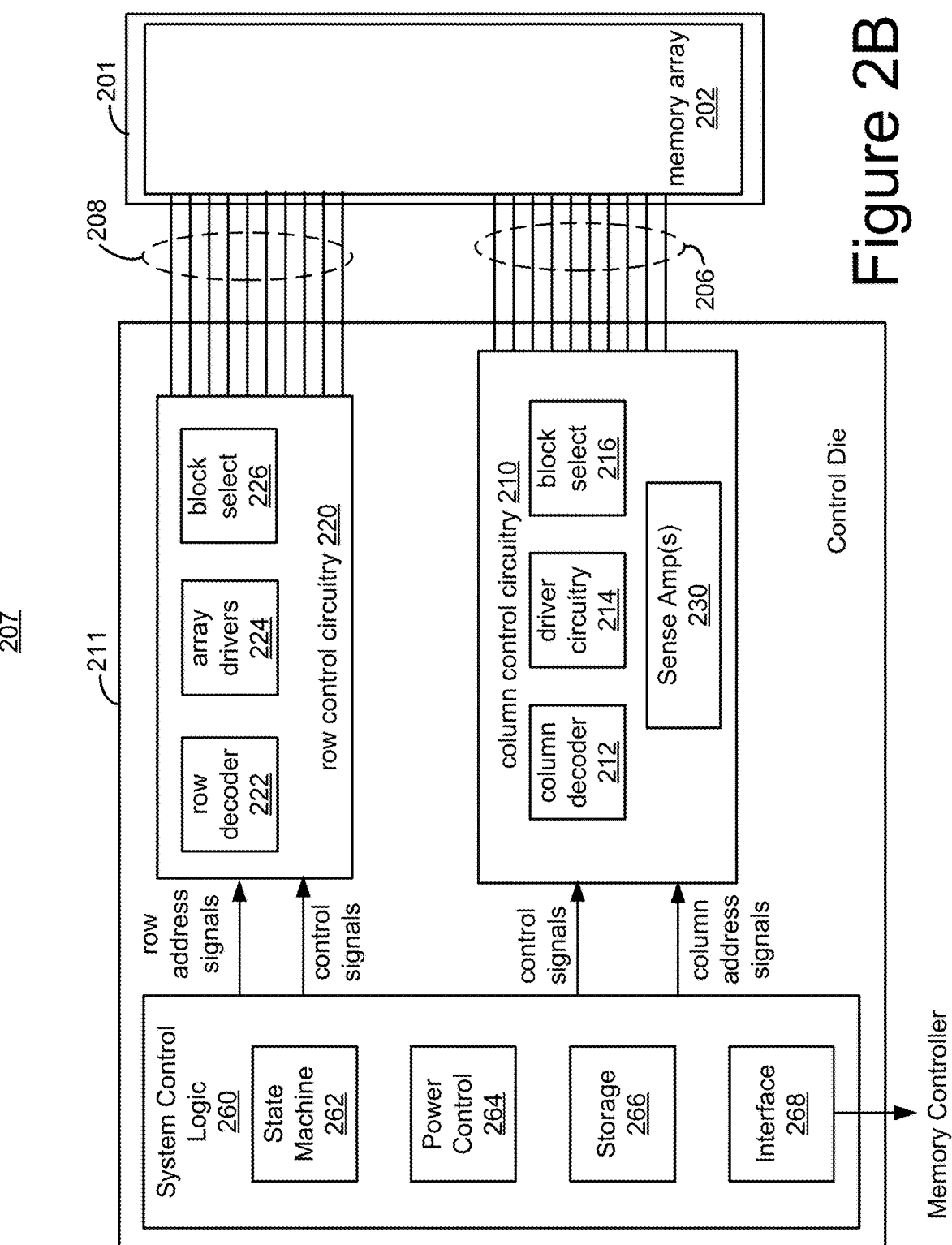
FIG. 2B is a block diagram of one embodiment of an integrated memory assembly.

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 207. One or more integrated memory assemblies 207 may be used to implement the non-volatile memory 130 of storage system 100. The integrated memory assembly 207 includes two types of semiconductor die (or more succinctly, "die"). Memory die 201 includes memory structure 202. Memory structure 202 includes non-volatile memory cells. Control die 211 includes control circuitry 260, 210, and 220 (as described above). In some embodiments, control die 211 is configured to connect to the memory structure 202 in the memory die 201. In some embodiments, the memory die 201 and the control die 211 are bonded together.

FIG. 2B shows an example of the peripheral circuitry, including control circuits, formed in a peripheral circuit or control die 211 coupled to memory structure 202 formed in memory die 201. Common components are labelled similarly to FIG. 2A. System control logic 260, row control circuitry 220, and column control circuitry 210 are located in control die 211. In some embodiments, all or a portion of the column control circuitry 210 and all or a portion of the row control circuitry 220 are located on the memory die 201. In some embodiments, some of the circuitry in the system control logic 260 is located on the on the memory die 201.

System control logic 260, row control circuitry 220, and column control circuitry 210 may be formed by a common process (e.g., CMOS process), so that adding elements and functionalities, such as ECC, more typically found on a memory controller 120 may require few or no additional process steps (i.e., the same process steps used to fabricate controller 120 may also be used to fabricate system control logic 260, row control circuitry 220, and column control circuitry 210). Thus, while moving such circuits from a die such as memory 2 die 201 may reduce the number of steps needed to fabricate such a die, adding such circuits to a die such as control die 211 may not require many additional process steps. The control die 211 could also be referred to as a CMOS die, due to the use of CMOS technology to implement some or all of control circuitry 260, 210, 220.

FIG. 2B shows column control circuitry 210 including sense amplifier(s) 230 on the control die 211 coupled to memory structure 202 on the memory die 201 through electrical paths 206. For example, electrical paths 206 may provide electrical connection between column decoder 212, driver circuitry 214, and block select 216 and bit lines of memory structure 202. Electrical paths may extend from column control circuitry 210 in control die 211 through pads on control die 211 that are bonded to corresponding pads of the memory die 201, which are connected to bit lines of memory structure 202. Each bit line of memory structure 202 may have a corresponding electrical path in electrical paths 206, including a pair of bond pads, which connects to column control circuitry 210. Similarly, row control circuitry 220, including row decoder 222, array drivers 224, and block select 226 are coupled to memory structure 202 through electrical paths 208. Each electrical path 208 may correspond to a word line, dummy word line, or select gate line. Additional electrical paths may also be provided between control die 211 and memory die 201.

For purposes of this document, the phrases "a control circuit" or "one or more control circuits" can include any one of or any combination of memory controller 120, state machine 262, all or a portion of system control logic 260, all or a portion of row control circuitry 220, all or a portion of column control circuitry 210, a microcontroller, a microprocessor, and/or other similar functioned circuits. The control circuit can include hardware only or a combination of hardware and software (including firmware). For example, a controller programmed by firmware to perform the functions described herein is one example of a control circuit. A control circuit can include a processor, FGA, ASIC, integrated circuit, or other type of circuit.

Figure 3A:
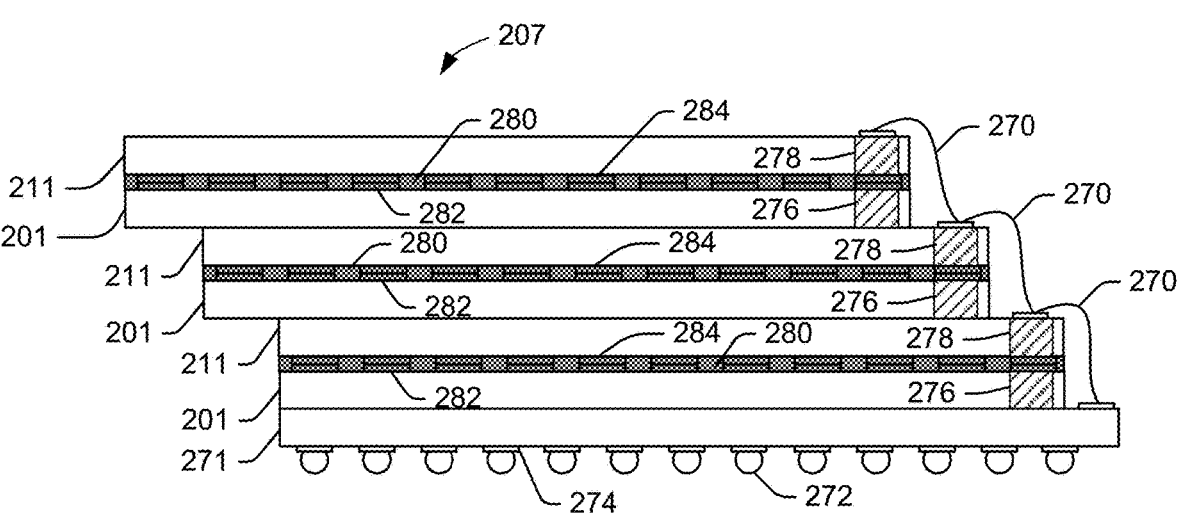
FIGS. 3A and 3B depict different embodiments of integrated memory assemblies.

In some embodiments, there is more than one control die 211 and more than one memory die 201 in an integrated memory assembly 207. In some embodiments, the integrated memory assembly 207 includes a stack of multiple control die 211 and multiple memory die 201. FIG. 3A depicts a side view of an embodiment of an integrated memory assembly 207 stacked on a substrate 271 (e.g., a stack comprising control dies 211 and memory dies 201). The integrated memory assembly 207 has three control dies 211 and three memory dies 201. In some embodiments, there are more than three memory dies 201 and more than three control die 211.

Each control die 211 is affixed (e.g., bonded) to at least one of the memory dies 201. Some of the bond pads 282/284 are depicted. There may be many more bond pads. A space between two dies 201, 211 that are bonded together is filled with a solid layer 280, which may be formed from epoxy or other resin or polymer. This solid layer 280 protects the electrical connections between the dies 201, 211, and further secures the dies together. Various materials may be used as solid layer 280, but in embodiments, it may be Hysol epoxy resin from Henkel Corp., having offices in California, USA.

The integrated memory assembly 207 may for example be stacked with a stepped offset, leaving the bond pads at each level uncovered and accessible from above. Wire bonds 270 connected to the bond pads connect the control die 211 to the substrate 271. A number of such wire bonds may be formed across the width of each control die 211 (i.e., into the page of FIG. 3A).

A memory die through silicon via (TSV) 276 may be used to route signals through a memory die 201. A control die through silicon via (TSV) 278 may be used to route signals through a control die 211. The TSVs 276, 278 may be formed before, during or after formation of the integrated circuits in the semiconductor dies 201, 211. The TSVs may be formed by etching holes through the wafers. The holes may then be lined with a barrier against metal diffusion. The barrier layer may in turn be lined with a seed layer, and the seed layer may be plated with an electrical conductor such as copper, although other suitable materials such as aluminum, tin, nickel, gold, doped polysilicon, and alloys or combinations thereof may be used.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package. The solder balls 272 may form a part of the interface between integrated memory assembly 207 and memory controller 120.

Figure 3B:
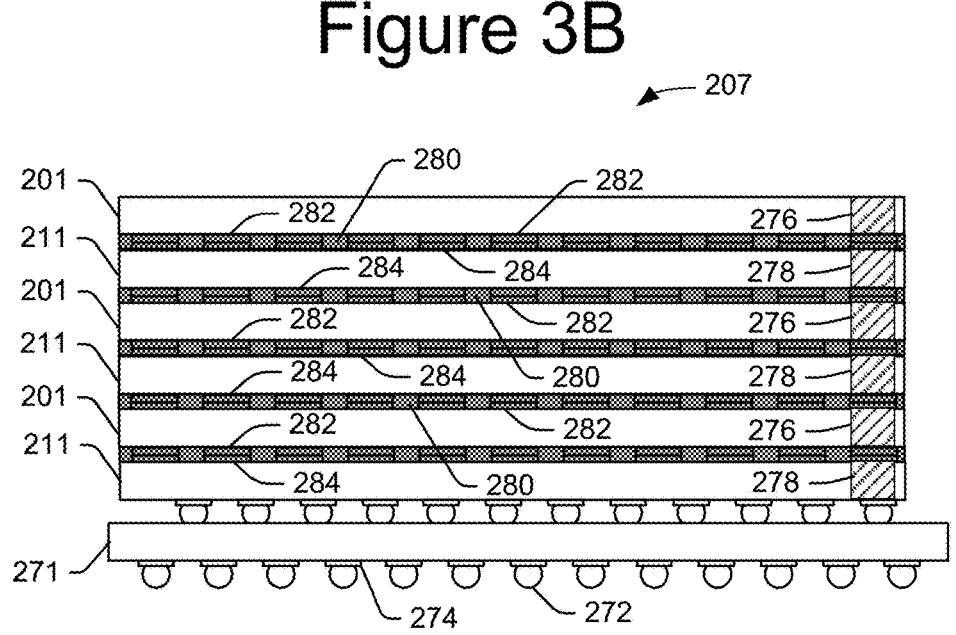

FIG. 3B depicts a side view of another embodiment of an integrated memory assembly 207 stacked on a substrate 271. The integrated memory assembly 207 of FIG. 3B has three control die 211 and three memory die 201. In some embodiments, there are many more than three memory dies 201 and many more than three control dies 211. In this example, each control die 211 is bonded to at least one memory die 201. Optionally, a control die 211 may be bonded to two or more memory die 201.

Some of the bond pads 282, 284 are depicted. There may be many more bond pads. A space between two dies 201, 211 that are bonded together is filled with a solid layer 280, which may be formed from epoxy or other resin or polymer. In contrast to the example in FIG. 3A, the integrated memory assembly 207 in FIG. 3B does not have a stepped offset. A memory die through silicon via (TSV) 276 may be used to route signals through a memory die 201. A control die through silicon via (TSV) 278 may be used to route signals through a control die 211.

Solder balls 272 may optionally be affixed to contact pads 274 on a lower surface of substrate 271. The solder balls 272 may be used to couple the integrated memory assembly 207 electrically and mechanically to a host device such as a printed circuit board. Solder balls 272 may be omitted where the integrated memory assembly 207 is to be used as an LGA package.

As has been briefly discussed above, the control die 211 and the memory die 201 may be bonded together. Bond pads on each die 201, 211 may be used to bond the two dies together. In some embodiments, the bond pads are bonded directly to each other, without solder or other added material, in a so-called Cu-to-Cu bonding process. In a Cu-to-Cu bonding process, the bond pads are controlled to be highly planar and formed in a highly controlled environment largely devoid of ambient particulates that might otherwise settle on a bond pad and prevent a close bond. Under such properly controlled conditions, the bond pads are aligned and pressed against each other to form a mutual bond based on surface tension. Such bonds may be formed at room temperature, though heat may also be applied. In embodiments using Cu-to-Cu bonding, the bond pads may be about 5 μm square and spaced from each other with a pitch of 5 μm to 5 μm. While this process is referred to herein as Cu-to-Cu bonding, this term may also apply even where the bond pads are formed of materials other than Cu.

When the area of bond pads is small, it may be difficult to bond the semiconductor dies together. The size of, and pitch between, bond pads may be further reduced by providing a film layer on the surfaces of the semiconductor dies including the bond pads. The film layer is provided around the bond pads. When the dies are brought together, the bond pads may bond to each other, and the film layers on the respective dies may bond to each other. Such a bonding technique may be referred to as hybrid bonding. In embodiments using hybrid bonding, the bond pads may be about 5 μm square and spaced from each other with a pitch of 1 μm to 5 μm. Bonding techniques may be used providing bond pads with even smaller (or greater) sizes and pitches.

Some embodiments may include a film on surface of the dies 201, 211. Where no such film is initially provided, a space between the dies may be under filled with an epoxy or other resin or polymer. The under-fill material may be applied as a liquid which then hardens into a solid layer. This under-fill step protects the electrical connections between the dies 201, 211, and further secures the dies together. Various materials may be used as under-fill material, but in embodiments, it may be Hysol epoxy resin from Henkel Corp., having offices in California, USA.

Figure 4:
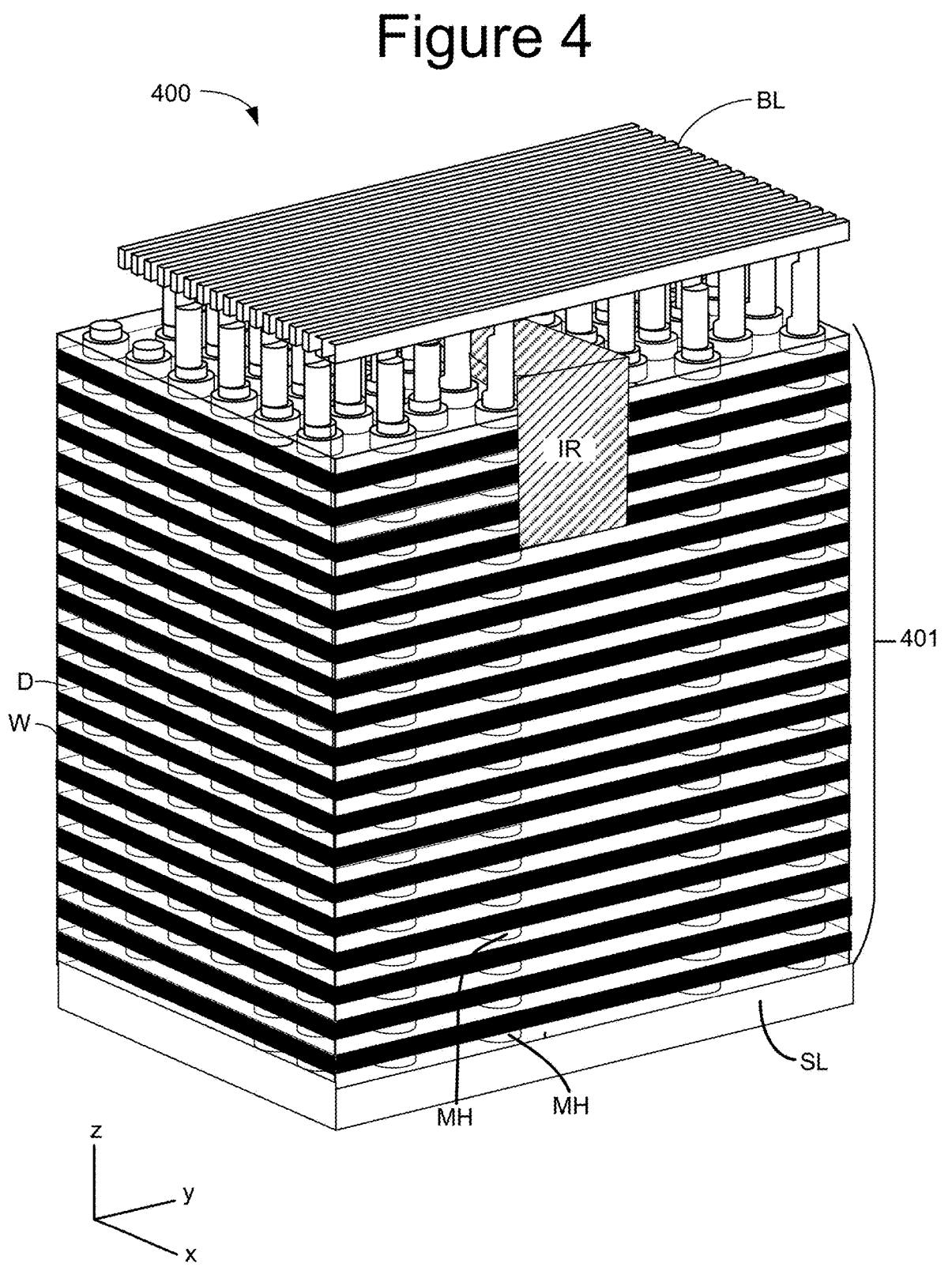
FIG. 4 is a perspective view of a portion of one embodiment of a monolithic three dimensional memory structure.

FIG. 4 is a perspective view of a portion of one example embodiment of a monolithic three dimensional memory array/structure that can comprise memory structure 202, which includes a plurality non-volatile memory cells arranged as vertical NAND strings. For example, FIG. 4 shows a portion 400 of one block of memory. The structure depicted includes a set of bit lines BL positioned above a stack 401 of alternating dielectric layers and conductive layers. For example purposes, one of the dielectric layers is marked as D and one of the conductive layers (also called word line layers) is marked as W. The number of alternating dielectric layers and conductive layers can vary based on specific implementation requirements. As will be explained below, in one embodiment the alternating dielectric layers and conductive layers are divided into sub-blocks by isolation regions IR. FIG. 4 shows one isolation region IR separating two sub-blocks. Below the alternating dielectric layers and word line layers is a source line layer SL. Memory holes are formed in the stack of alternating dielectric layers and conductive layers. For example, one of the memory holes is marked as MH. Note that in FIG. 4, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. Thus, the non-volatile memory cells are arranged in memory holes. More details of the three dimensional monolithic memory array that comprises memory structure 202 is provided below.

Figure 4A:
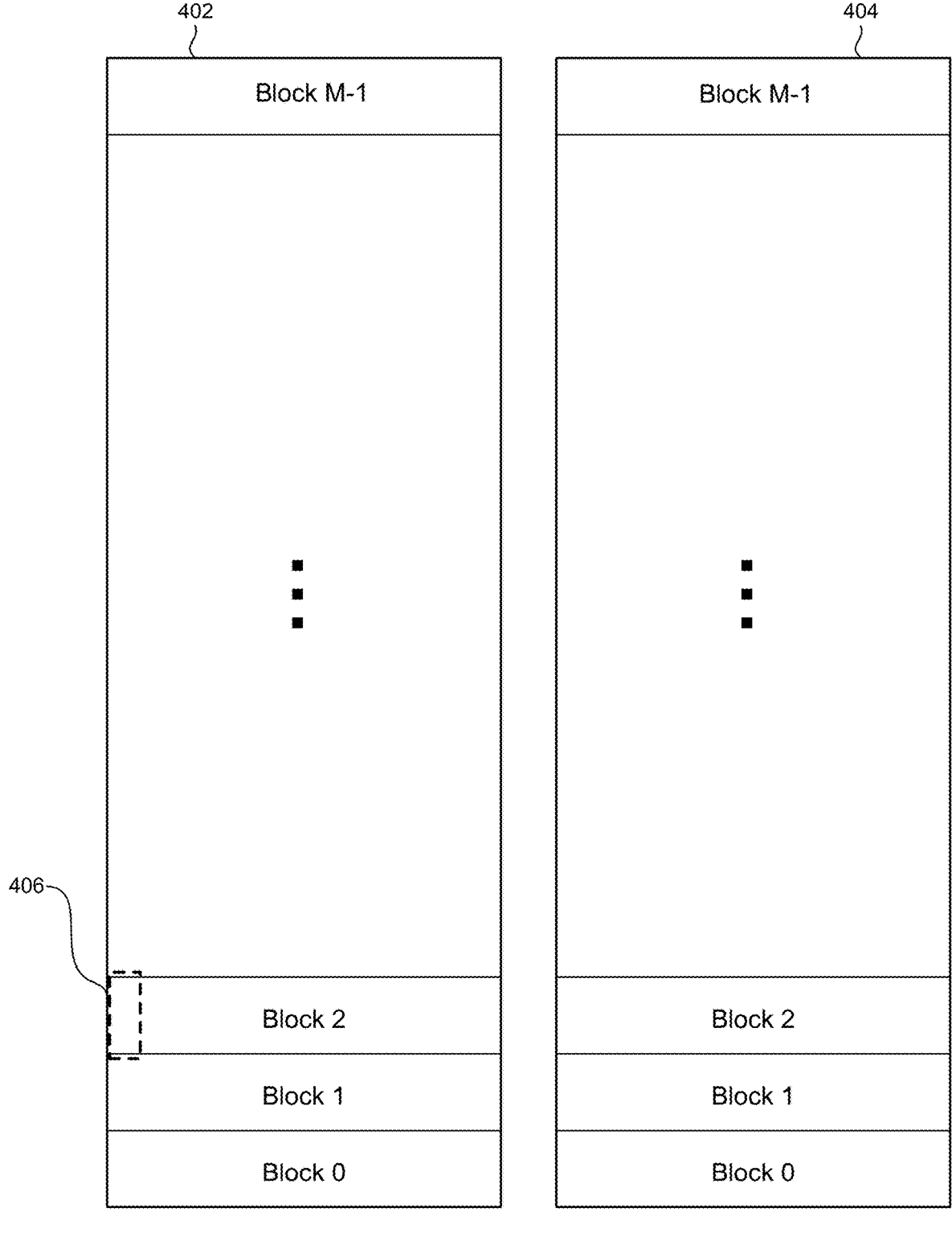
FIG. 4A is a block diagram of one embodiment of a memory structure having two planes.

FIG. 4A is a block diagram explaining one example organization of memory structure 202, which is divided into two planes 402 and 404. Each plane is then divided into M blocks. In one example, each plane has about 2000 blocks. However, different numbers of blocks and planes can also be used. In one embodiment, a block of memory cells is a unit of erase. That is, all memory cells of a block are erased together. In other embodiments, blocks can be divided into sub-blocks and the sub-blocks can be the unit of erase. Memory cells can also be grouped into blocks for other reasons, such as to organize the memory structure to enable the signaling and selection circuits. In one embodiment, a block includes a group of memory cells (or group of NAND strings) connected to a common set of word lines, and different blocks are connected to different word lines. For example, the word lines for a block are all connected to all of the vertical NAND strings for that block. Although FIG. 4A shows two planes 402/404, more or less than two planes can be implemented. In some embodiments, memory structure 202 includes eight planes.

Figure 4B:
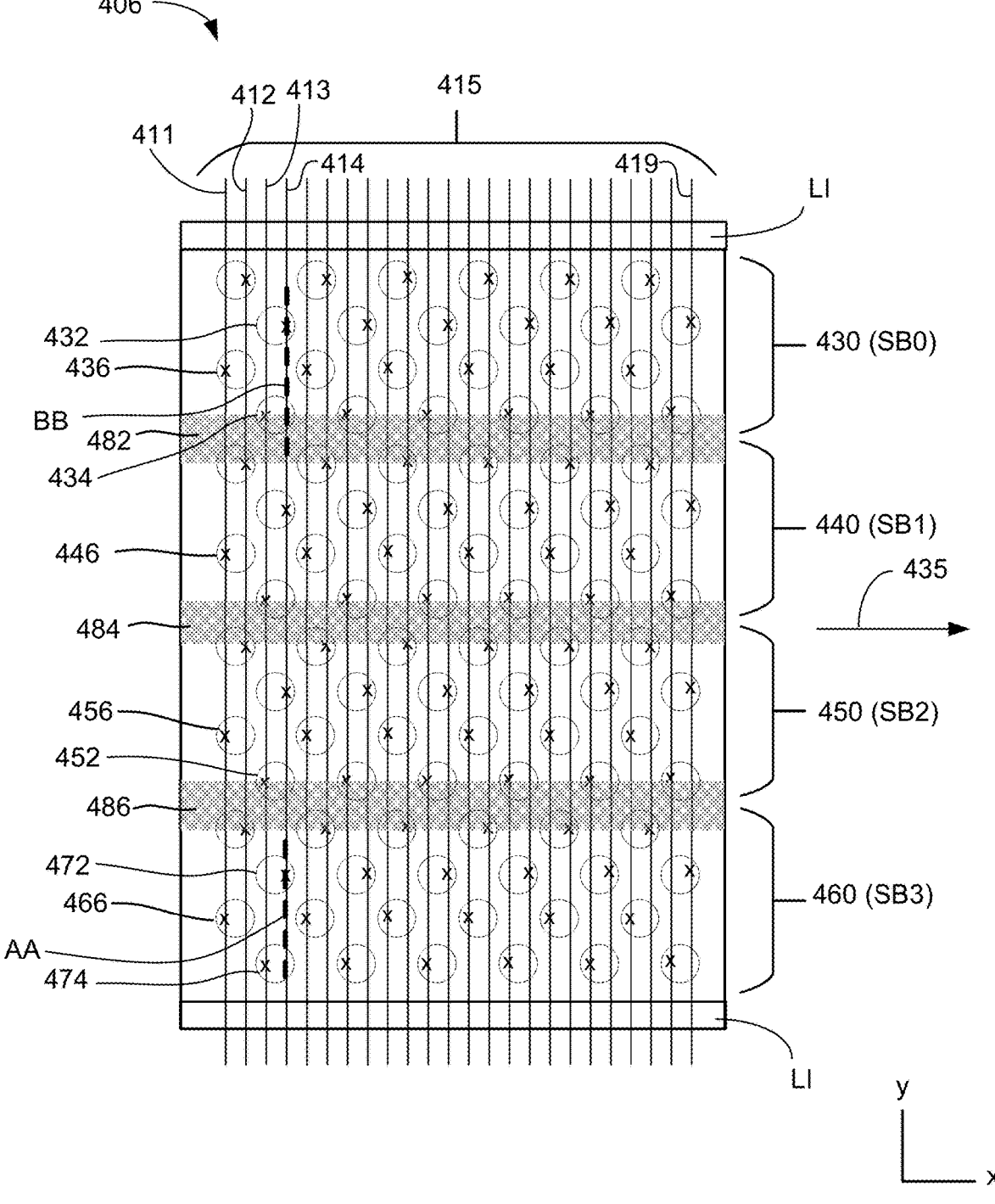
FIG. 4B depicts a top view of a portion of one embodiment of a block of memory cells.

FIGS. 4B-4H depict an example three dimensional ("3D") NAND structure that corresponds to the structure of FIG. 4 and can be used to implement memory structure 202 of FIGS. 2A and 2B. FIG. 4B is a block diagram depicting a top view of a portion 406 of Block 2 of plane 402. As can be seen from FIG. 4B, the block depicted in FIG. 4B extends in the direction of arrow 435. In one embodiment, the memory array has many layers; however, FIG. 4B only shows the top layer.

FIG. 4B depicts a plurality of circles that represent the memory holes, which are also referred to as vertical columns. Each of the memory holes/vertical columns include multiple gate induced drain leakage ("GIDL") generation transistors, multiple select transistors (also referred to as a select gates or selection gates) and multiple memory cells. In one embodiment, each memory hole/vertical column implements a NAND string. For example, FIG. 4B labels a subset of the memory holes/vertical columns/NAND strings 432, 436, 446, 456, 462, 466, 472, and 474.

FIG. 4B also depicts a set of bit lines 415, including bit lines 411, 412, 413, 414, . . . 419. FIG. 4B shows twenty four bit lines because only a portion of the block is depicted. It is contemplated that more than twenty four bit lines connected to memory holes/vertical columns of the block. Each of the circles representing memory holes/vertical columns has an "x" to indicate its connection to one bit line. For example, bit line 411 is connected to memory holes/vertical columns 436, 446, 456, and 466.

The block depicted in FIG. 4B includes a set of isolation regions 482, 484, and 486, which are formed of $SiO_2$; however, other dielectric materials can also be used. Isolation regions 482, 484, and 486 serve to divide the top layers of the block into regions so that the block is divided into sub-blocks; for example, the top layer depicted in FIG. 4B is divided into regions 430, 440, 450, and 460 corresponding to sub-blocks SB), SB1, SB2 and SB3. Region 430 corresponds to sub-block SB0. Region 440 corresponds to sub-block SB1. Region 450 corresponds to sub-block SB2. Region 460 corresponds to sub-block SB3. Each sub-block represents a subset or portion of the block. The technology proposed herein allows each sub-block to be independently programmed and erased, which allows memory operation and usage to be more efficient. Additionally, by allowing a sub-block to be erased without erasing the entire block, the memory cells endurance will be increased due to the reduced memory operations being performed on each memory cell. In one embodiment, the isolation regions only divide the layers used to implement GIDL generation transistors and select gates so that NAND strings in different regions can be independently selected. In one embodiment, there are isolation regions for the top layers (drain side GIDL generation transistors and select gates) and isolation regions for the bottom layers (source side GIDL generation transistors and select gates). In one example implementation, a bit line connects to one memory hole/vertical column/NAND string in each of regions 430, 440, 450, and 460. In one embodiment, all of the four memory holes/vertical columns/NAND strings connected to a common bit line are connected to the same set of word lines; therefore, the system uses the drain side selection lines and/or source side selection lines to choose one (or another subset) of the four to be subjected to a memory operation (program, verify, read, and/or erase).

FIG. 4B also shows Line Interconnects LI, which are metal connections to the source line SL from above the memory array. Line Interconnects LI are positioned adjacent regions 430 and 470.

Although FIG. 4B shows each region/sub-block 430 (SB0), 440 (SB1), 450 (SB2), and 460 (SB3) having four rows of memory holes/vertical columns, five regions and twenty four rows of memory holes/vertical columns in a block, those exact numbers are an example implementation. Other embodiments may include more or less regions per block, more or less rows of memory holes/vertical columns per region and more or less rows of vertical columns per block. FIG. 4B also shows the memory holes/vertical columns being staggered. In other embodiments, different patterns of staggering can be used. In some embodiments, the memory holes/vertical columns are not staggered.

Figure 4C:
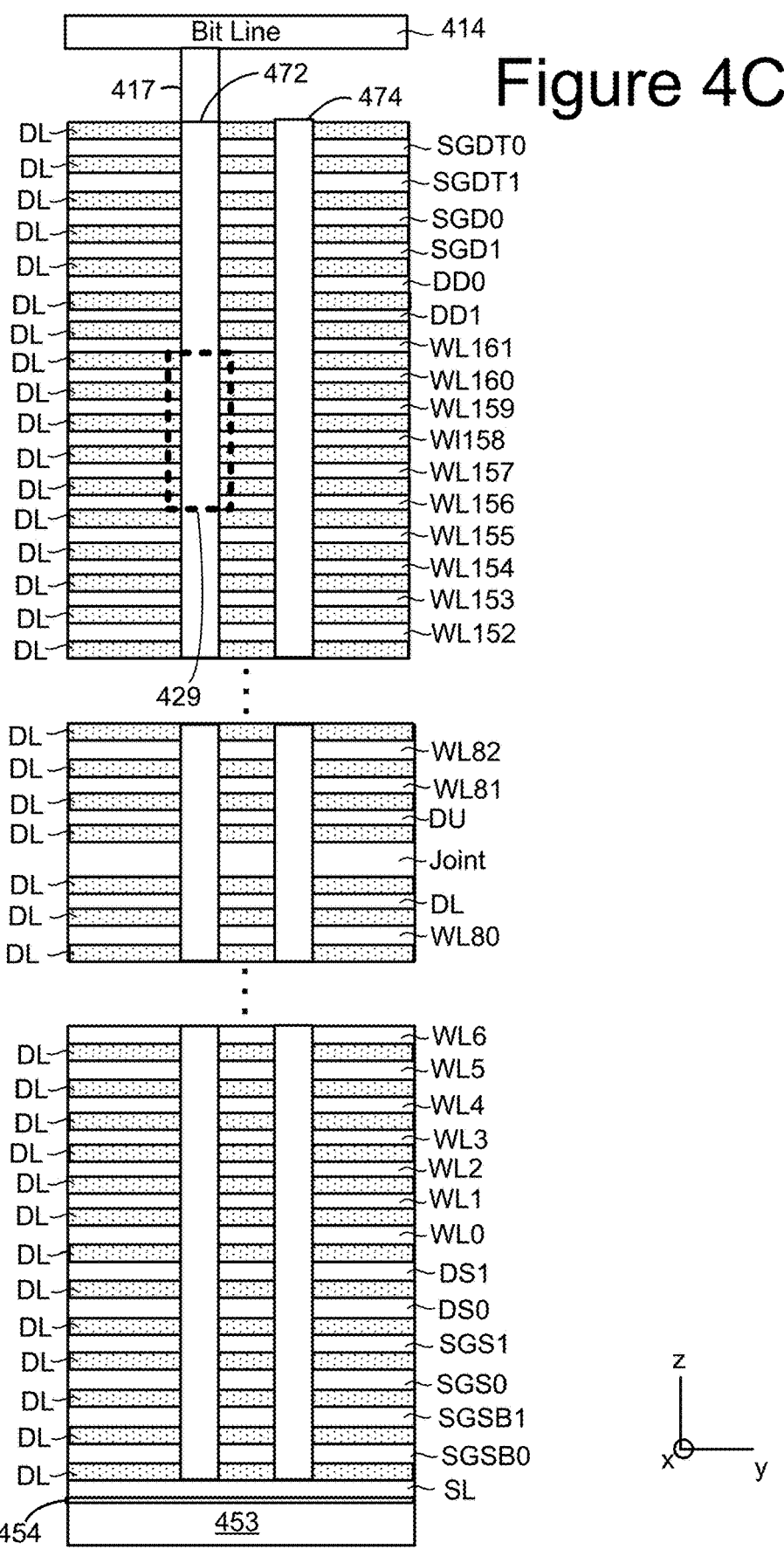
FIG. 4C depicts a cross sectional view of a portion of one embodiment of a block of memory cells.

FIG. 4C depicts a portion of one embodiment of a three dimensional memory structure 202 showing a cross-sectional view along line AA of FIG. 4B. This cross sectional view cuts through memory holes/vertical columns (NAND strings) 472 and 474 of region 470 (see FIG. 4B). The structure of FIG. 4C includes two drain side select layers SGD0 and SGD1; two source side select layers SGS0 and SGS; two drain side GIDL generation transistor layers SGDT0 and SGDT1; two source side GIDL generation transistor layers SGSB0 and SGSB1; two drain side dummy word line layers DD0 and DD1; two source side dummy word line layers DS0 and DS1; dummy word line layers DU and DL; one hundred and sixty two word line layers WL0-WL161 for connecting to data memory cells, and dielectric layers DL. Other embodiments can implement more or less than the numbers described above for FIG. 4C. In one embodiment, SGD0 and SGD1 are connected together; and SGS0 and SGS1 are connected together. In other embodiments, more or less number of SGDs (greater or lesser than two) are connected together, and more or less number of SGSs (greater or lesser than two) are connected together.

In one embodiment, erasing the memory cells is performed using GIDL, which includes generating charge carriers at the GIDL generation transistors such that the carriers get injected into the charge trapping layers of the NAND strings to change threshold voltage of the memory cells. FIG. 4C shows two GIDL generation transistors at each end of the NAND string; however, in other embodiments there are more or less than two. Embodiments that use GIDL at both sides of the NAND string may have GIDL generation transistors at both sides. Embodiments that use GIDL at only the drain side of the NAND string may have GIDL generation transistors only at the drain side. Embodiments that use GIDL at only the source side of the NAND string may have GIDL generation transistors only at the source side.

FIG. 4C shows two GIDL generation transistors at each end of the NAND string. It is likely that charge carriers are only generated by GIDL at one of the two GIDL generation transistors at each end of the NAND string. Based on process variances during manufacturing, it is likely that one of the two GIDL generation transistors at an end of the NAND string is best suited for GIDL. For example, the GIDL generation transistors have an abrupt p-n junction to generate the charge carriers for GIDL and, during fabrication, a phosphorous diffusion is performed at the polysilicon channel of the GIDL generation transistors. In some cases, the GIDL generation transistor with the shallowest phosphorous diffusion is the GIDL generation transistor that generates the charge carriers during erase. However, in some embodiments charge carriers can be generated by GIDL at multiple GIDL generation transistors at a particular side of the NAND string.

Memory holes/Vertical columns 472 and 474 are depicted protruding through the drain side select layers, source side select layers, dummy word line layers, GIDL generation transistor layers and word line layers. In one embodiment, each memory hole/vertical column comprises a vertical NAND string. Below the memory holes/vertical columns and the layers listed below is substrate 453, an insulating film 454 on the substrate, and source line SL. The NAND string of memory hole/vertical column 472 has a source end at a bottom of the stack (the source side) and a drain end at a top of the stack (bit line side). As in agreement with FIG. 4B, FIG. 4C show vertical memory hole/column 472 connected to bit line 414 via connector 417.

For ease of reference, drain side select layers; source side select layers, dummy word line layers, GIDL generation transistor layers and data word line layers collectively are referred to as the conductive layers. In one embodiment, the conductive layers are made from a combination of TiN and Tungsten. In other embodiments, other materials can be used to form the conductive layers, such as doped polysilicon, metal such as Tungsten, metal silicide, such as nickel silicide, tungsten silicide, aluminum silicide or the combination thereof. In some embodiments, different conductive layers can be formed from different materials. Between conductive layers are dielectric layers DL. In one embodiment, the dielectric layers are made from $SiO_2$. In other embodiments, other dielectric materials can be used to form the dielectric layers.

The non-volatile memory cells are formed along memory holes/vertical columns which extend through alternating conductive and dielectric layers in the stack. In one embodiment, the memory cells are arranged in NAND strings. The word line layers WL0-W161 connect to memory cells (also called data memory cells). Dummy word line layers connect to dummy memory cells. A dummy memory cell does not store and is not eligible to store host data (data provided from the host, such as data from a user of the host), while a data memory cell is eligible to store host data. In some embodiments, data memory cells and dummy memory cells may have a same structure. Drain side select layers SGD0 and SGD1 are used to electrically connect and disconnect NAND strings from bit lines. Source side select layers SGS0 and SGS1 are used to electrically connect and disconnect NAND strings from the source line SL.

FIG. 4C shows that the memory array is implemented as a two tier architecture, with the tiers separated by a Joint area. In one embodiment it is expensive and/or challenging to etch so many word line layers intermixed with dielectric layers. To case this burden, one embodiment includes laying down a first stack of word line layers (e.g., WL0-WL80) alternating with dielectric layers, laying down the Joint area, and laying down a second stack of word line layers (e.g., WL81-WL161) alternating with dielectric layers. The Joint areas are positioned between the first stack and the second stack. In one embodiment, the Joint areas are made from the same materials as the word line layers. In other embodiments, there can be no Joint area or multiple Joint areas.

Figure 4D:
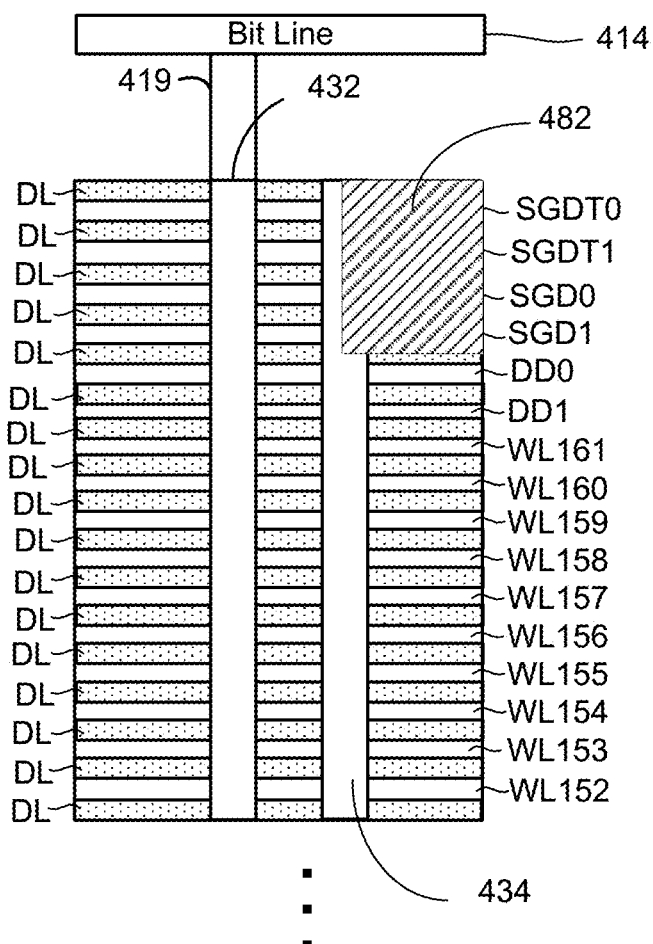
FIG. 4D depicts a cross sectional view of a portion of one embodiment of a block of memory cells.

FIG. 4D depicts a portion of one embodiment of a three dimensional memory structure 202 showing a cross-sectional view along line BB of FIG. 4B. This cross sectional view cuts through memory holes/vertical columns (NAND strings) 432 and 434 of region 430 (see FIG. 4B). FIG. 4D shows the same alternating conductive and dielectric layers as FIG. 4C. FIG. 4D also shows isolation region 482. Isolation regions 482, 484, and 486) occupy space that would have been used for a portion of the memory holes/vertical columns/NAND stings. For example, isolation region 482 occupies space that would have been used for a portion of memory hole/vertical column 434. More specifically, a portion (e.g., half the diameter) of vertical column 434 has been removed in layers SGDT0, SGDT1, SGD0, and SGD1 to accommodate isolation region 482 so that these layers can be independently controlled for the different sub-blocks SB0, SB1, SB2 and SB3. Thus, while most of the vertical column 434 is cylindrical (with a circular cross section), the portion of vertical column 434 in layers SGDT0, SGDT1, SGD0, and SGD1 has a semi-circular cross section. In one embodiment, after the stack of alternating conductive and dielectric layers is formed, the stack is etched to create space for the isolation region and that space is then filled in with $SiO_2$. In some embodiments, the bottom of the stack also has an isolation region with a similar structure as depicted in FIG. 4D for isolation region 482 at the top of the stack in order to remove portions of layers SGSB0, SGSB1, SGS0, and SGS1 so that these layers can be independently controlled for the different sub-blocks SB0, SB1, SB2 and SB3.

Figure 4E:
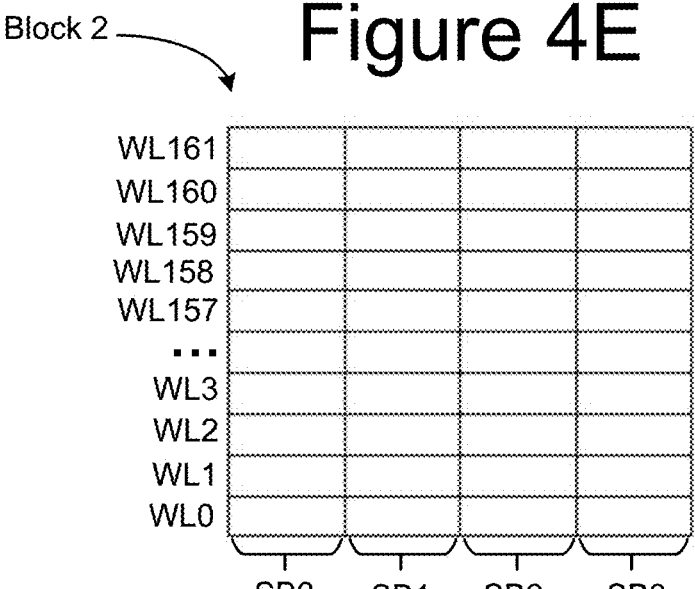
FIG. 4E is a block diagram depicting a block divided into sub-blocks.

FIG. 4E is a block diagram showing how a block (e.g., Block 2) is divided into sub-blocks SB0, SB1, SB2 and SB3. FIG. 4E shows all word lines WL0-WL161 connected to each of sub-blocks SB0, SB1, SB2 and SB3. Each of the sub-blocks includes multiple NAND strings connected to WL0-WL161.

Figure 4F:
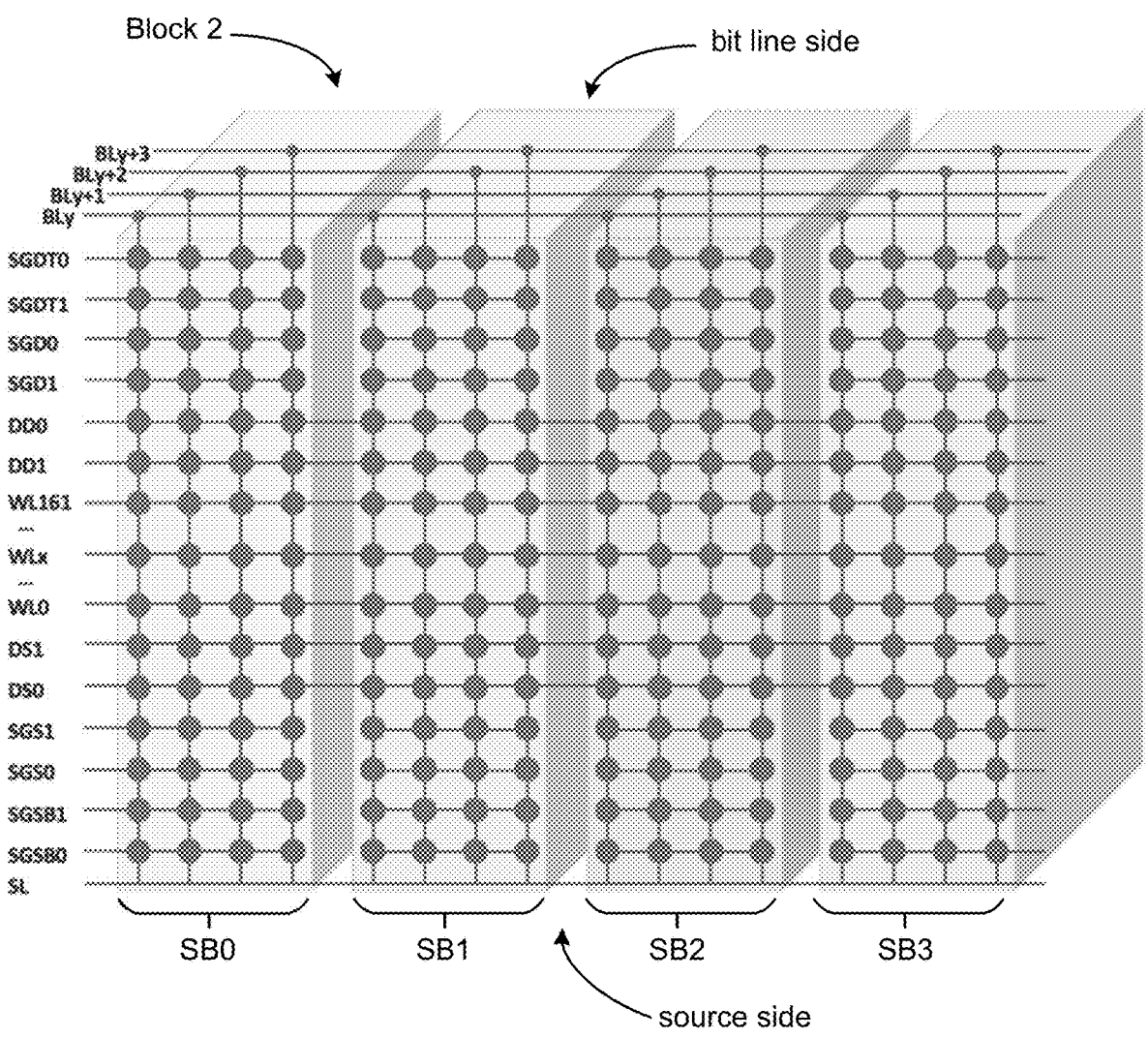
FIG. 4F is a block diagram depicting a block divided into sub-blocks.

FIG. 4F is another block diagram showing more detail of how a block (e.g., Block 2) is divided into sub-blocks SB0, SB1, SB2 and SB3. Block 2 is depicted as having a source side (same side as source line SL) and a bit line side (same side as bit lines). The bit line side is sometimes also known as the drain side. Each of the solid circles represents a memory cell. Word lines WL0-WL161 are connected to memory cells in sub-blocks SB0, SB1, SB2 and SB3. That is, each of the word lines WL0-WL161 are connected to all of the sub-blocks SB0, SB1, SB2 and SB3. In other words, all of the word lines WL0-WL161 connected to Block 2 are connected to all of the sub-blocks (SB0, SB1, SB2 and SB3) of Block 2 (including a sub-block selected for a memory operation and all sub-blocks that are unselected for the memory operation). In this manner, a voltage applied to a word line is applied to all sub-blocks (e.g., SB0, SB1, SB2 and SB3) of Block 2. FIG. 4F shows how drain side select layers SGD0 and SGD1, drain side (or bit line side) GIDL generation transistor layers SGDT0 and SGDT1, source side select layers SGS0 and SGS1, and source side GIDL generation transistor layers SGSB0 and SGSB1 are separated for each of sub-blocks SB0, SB1, SB2 and SB3 so that sub-blocks SB0, SB1, SB2 and SB3 can be independently controlled for programming, erasing and reading. Thus, while the source line SL is connected to all sub-blocks (SB0, SB1, SB2 and SB3) of Block 2, the source side select lines (SGS0 and SGS1), source side GIDL generation transistor control lines (SGSB0 and SGSB1), drain side select lines (SGD0 and SGD1), and drain (bit line) side GIDL generation transistor control lines (SGDT0 and SGDT1) are each connected to only one sub-block of the selected block. FIG. 4F also depicts a subset of the bit lines (e.g., Bly, Bly+1, Bly+2, Bly+3, . . . ), each of which is connected to one NAND string in each of sub-blocks SB0, SB1, SB2 and SB3 such that each bit line is separately connected to all sub-blocks of the block.

Figure 4G:
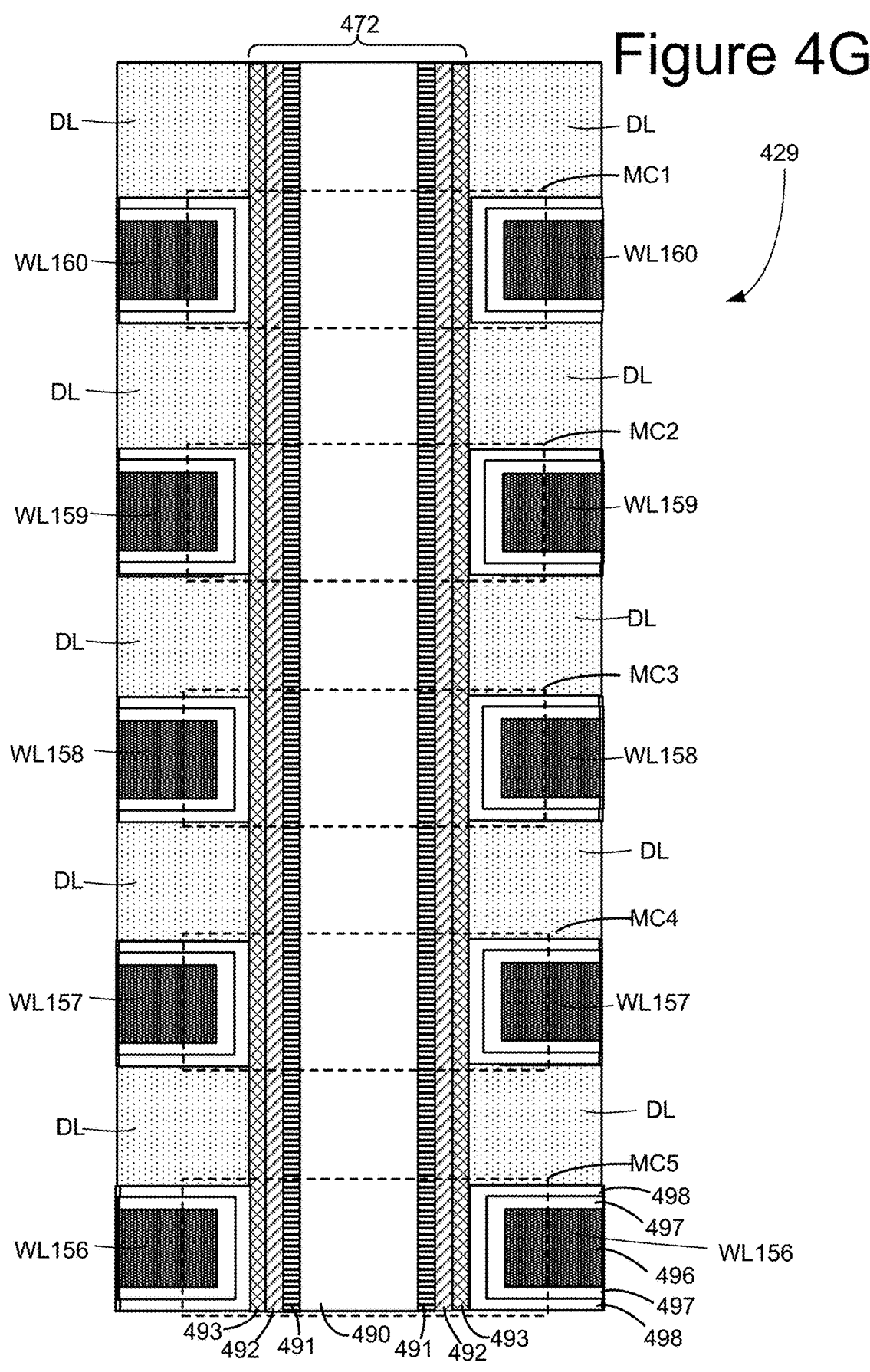
FIG. 4G is a cross sectional view of one embodiment of a portion of a vertical column of memory cells.

FIG. 4G depicts a cross sectional view of region 429 of FIG. 4C that includes a portion of memory hole/vertical column 472. In one embodiment, the memory holes/vertical columns are round; however, in other embodiments other shapes can be used. In one embodiment, memory hole/vertical column 472 includes an inner core layer 490 that is made of a dielectric, such as SiO$_2$. Other materials can also be used. Surrounding inner core 490 is polysilicon channel 491. Materials other than polysilicon can also be used. Note that it is the channel 491 that connects to the bit line and the source line. Surrounding channel 491 is a tunneling dielectric 492. In one embodiment, tunneling dielectric 492 has an ONO structure. Surrounding tunneling dielectric 492 is charge trapping layer 493, such as (for example) Silicon Nitride. Other memory materials and structures can also be used. The technology described herein is not limited to any particular material or structure.

FIG. 4G depicts dielectric layers DL as well as word line layers WL160, WL159, WL158, WL157, and WL156. Each of the word line layers includes a word line region 496 surrounded by an aluminum oxide layer 497, which is surrounded by a blocking oxide layer 498. In other embodiments, the blocking oxide layer can be a vertical layer parallel and adjacent to charge trapping layer 493. The physical interaction of the word line layers with the vertical column forms the memory cells. Thus, a memory cell, in one embodiment, comprises channel 491, tunneling dielectric 492, charge trapping layer 493, blocking oxide layer 498, aluminum oxide layer 497 and word line region 496. For example, word line layer WL160 and a portion of memory hole/vertical column 472 comprise a memory cell MC1. Word line layer WL159 and a portion of memory hole/vertical column 472 comprise a memory cell MC2. Word line layer WL158 and a portion of memory hole/vertical column 472 comprise a memory cell MC3. Word line layer WL157 and a portion of memory hole/vertical column 472 comprise a memory cell MC4. Word line layer WL156 and a portion of memory hole/vertical column 472 comprise a memory cell MC5. In other architectures, a memory cell may have a different structure; however, the memory cell would still be the storage unit.

When a memory cell is programmed, electrons are stored in a portion of the charge trapping layer 493 which is associated with (e.g. in) the memory cell. These electrons are drawn into the charge trapping layer 493 from the channel 491, through the tunneling dielectric 492, in response to an appropriate voltage on word line region 496. The threshold voltage (Vth) of a memory cell is increased in proportion to the amount of stored charge. In one embodiment, the programming is achieved through Fowler-Nordheim tunneling of the electrons into the charge trapping layer. During an erase operation, the electrons return to the channel or holes are injected into the charge trapping layer to recombine with electrons. In one embodiment, erasing is achieved using hole injection into the charge trapping layer via a physical mechanism such as GIDL.

Figure 4H:
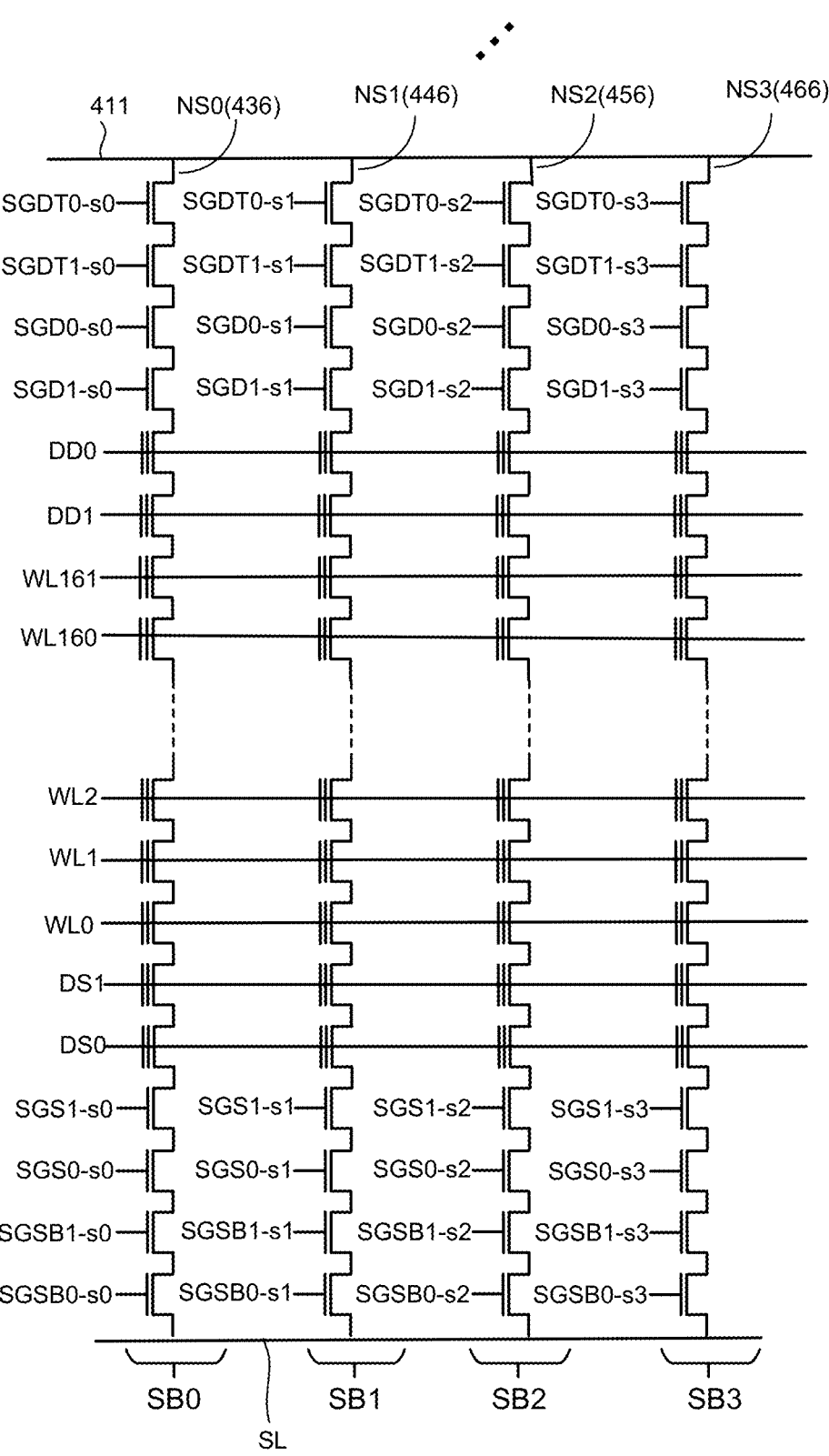
FIG. 4H is a schematic of a plurality of NAND strings in multiple sub-blocks of a same block.

FIG. 4H is a schematic diagram of a portion of the memory array 202 depicted in FIGS. 4-4G. FIG. 4H shows physical data word lines WL0-WL161 running across the entire block. The structure of FIG. 4H corresponds to portion 406 in Block 2 of FIG. 4A, including bit line 411. Within the block, in one embodiment, each bit line is connected to four NAND strings (one in each sub-block). Thus, FIG. 4H shows bit line 411 connected to NAND string NS0 (which corresponds to memory hole/vertical column 436 of sub-block SB0), NAND string NS1 (which corresponds to memory hole/vertical column 446 of sub-block SB1), NAND string NS2 (which corresponds to vertical column 456 of sub-block SB2), and NAND string NS3 (which corresponds to memory hole/vertical column 466 of sub-block SB3).

Drain side select line/layer SGD0 is separated by isolation regions (e.g., isolation regions 482, 484, and 486) to form SGD0-s0, SGD0-s1, SGD0-s2, and SGD0-s3 in order to separately connect to and independently control the sub-blocks (e.g., SB0, SB1, SB2 and SB3). Similarly, drain side select line/layer SGD1 is separated by isolation regions to form SGD1-s0, SGD1-s1, SGD1-s2, and SGD1-s3 in order to separately connect to and independently control the sub-blocks; drain (bit line) side GIDL generation transistor control line/layer SGDT0 is separated by isolation regions to form SGDT0-s0, SGDT0-s1, SGDT0-s2, and SGDT0-s3 in order to separately connect to and independently control the sub-blocks; drain (bit line) side GIDL generation transistor control line/layer SGDT1 is separated by isolation regions to form SGDT1-s0, SGDT1-s1, SGDT1-s2, and SGDT1-s3 in order to separately connect to and independently control the sub-blocks; source side select line/layer SGS0 is separated by isolation regions to form SGS0-s0, SGS0-s1, SGS0-s2, and SGS0-s3 in order to separately connect to and independently control the sub-blocks; source side select line/layer SGS1 is separated by isolation regions to form SGS1-s0, SGS1-s1, SGS1-s2, and SGS1-s3 in order to separately connect to and independently control the sub-blocks; source side GIDL generation transistor control line/layer SGSB0 is separated by isolation regions to form SGSB0-s0, SGSB0-s1, SGSB0-s2, and SGSB0-s3 in order to separately connect to and independently control the sub-blocks; and source side GIDL generation transistor control line/layer SGSB1 is separated by isolation regions to form SGSB1-s0, SGSB1-s1, SGSB1-s2, and SGSB1-s3 in order to separately connect to and independently control the sub-blocks.

SGD0-s0, SGD1-s0, SGDT0-s0, SGDT1-s0, SGS0-s0, SGS1-s0, SGSB0-s0, and SGSB1-s0, are connected to sub-block SB0. SGD0-s1, SGD1-s1, SGDT0-s1, SGDT1-s1, SGS0-s1, SGS1-s1, SGSB0-s1, and SGSB1-s1, are connected to sub-block SB1. SGD0-s2, SGD1-s2, SGDT0-s2, SGDT1-s2, SGS0-s2, SGS1-s2, SGSB0-s2, and SGSB1-s2, are connected to sub-block SB2. SGD0-s3, SGD1-s3, SGDT0-s3, SGDT1-s3, SGS0-s3, SGS1-s3, SGSB0-s3, and SGSB1-s3, are connected to sub-block SB03.

Although the example memories of FIGS. 4-4*h* are three dimensional memory structures that include vertical NAND strings with charge-trapping material, other (2D and 3D) memory structures can also be used with the technology described herein.

Figure 5A:
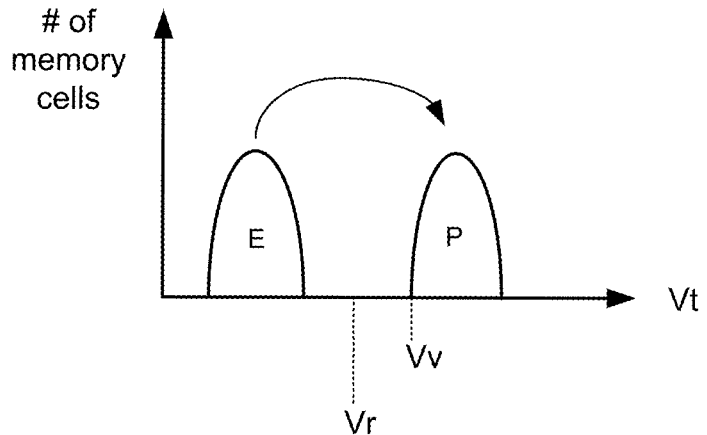
FIG. 5A depicts threshold voltage distributions.

The memory systems discussed above can be erased, programmed and read. At the end of a successful programming process, the threshold voltages of the memory cells should be within one or more distributions of threshold voltages for programmed memory cells or within a distribution of threshold voltages for erased memory cells, as appropriate. FIG. 5A is a graph of threshold voltage versus number of memory cells, and illustrates example threshold voltage distributions for the memory array when each memory cell stores one bit of data per memory cell. Memory cells that store one bit of data per memory cell data are referred to as single level cells ("SLC"). The data stored in SLC memory cells is referred to as SLC data; therefore, SLC data comprises one bit per memory cell. Data stored as one bit per memory cell is SLC data. FIG. 5A shows two threshold voltage distributions: E and P. Threshold voltage distribution E corresponds to an erased data state. Threshold voltage distribution P corresponds to a programmed data state. Memory cells that have threshold voltages in threshold voltage distribution E are, therefore, in the erased data state (e.g., they are erased). Memory cells that have threshold voltages in threshold voltage distribution P are, therefore, in the programmed data state (e.g., they are programmed). In one embodiment, erased memory cells store data "1" and programmed memory cells store data "0." FIG. 5A depicts read reference voltage Vr. By testing (e.g., performing one or more sense operations) whether the threshold voltage of a given memory cell is above or below Vr, the system can determine whether a memory cells is erased (state E) or programmed (state P). FIG. 5A also depicts verify reference voltage Vv. In some embodiments, when programming memory cells to data state P, the system will test whether those memory cells have a threshold voltage greater than or equal to Vv.

Figure 5B:
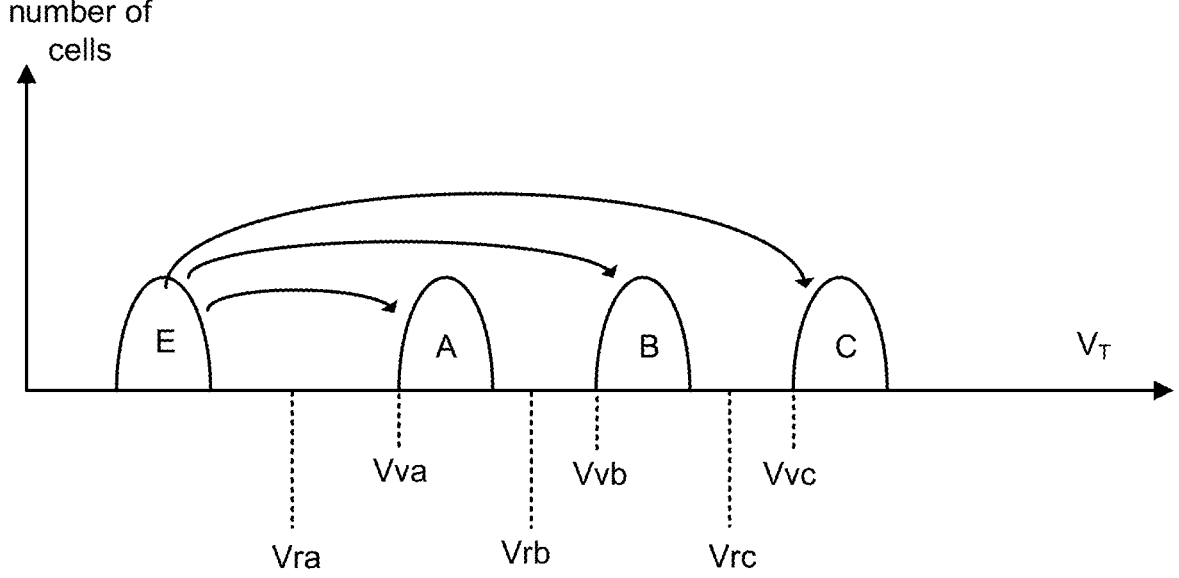
FIG. 5B depicts threshold voltage distributions.
Figures 5C, 5D:
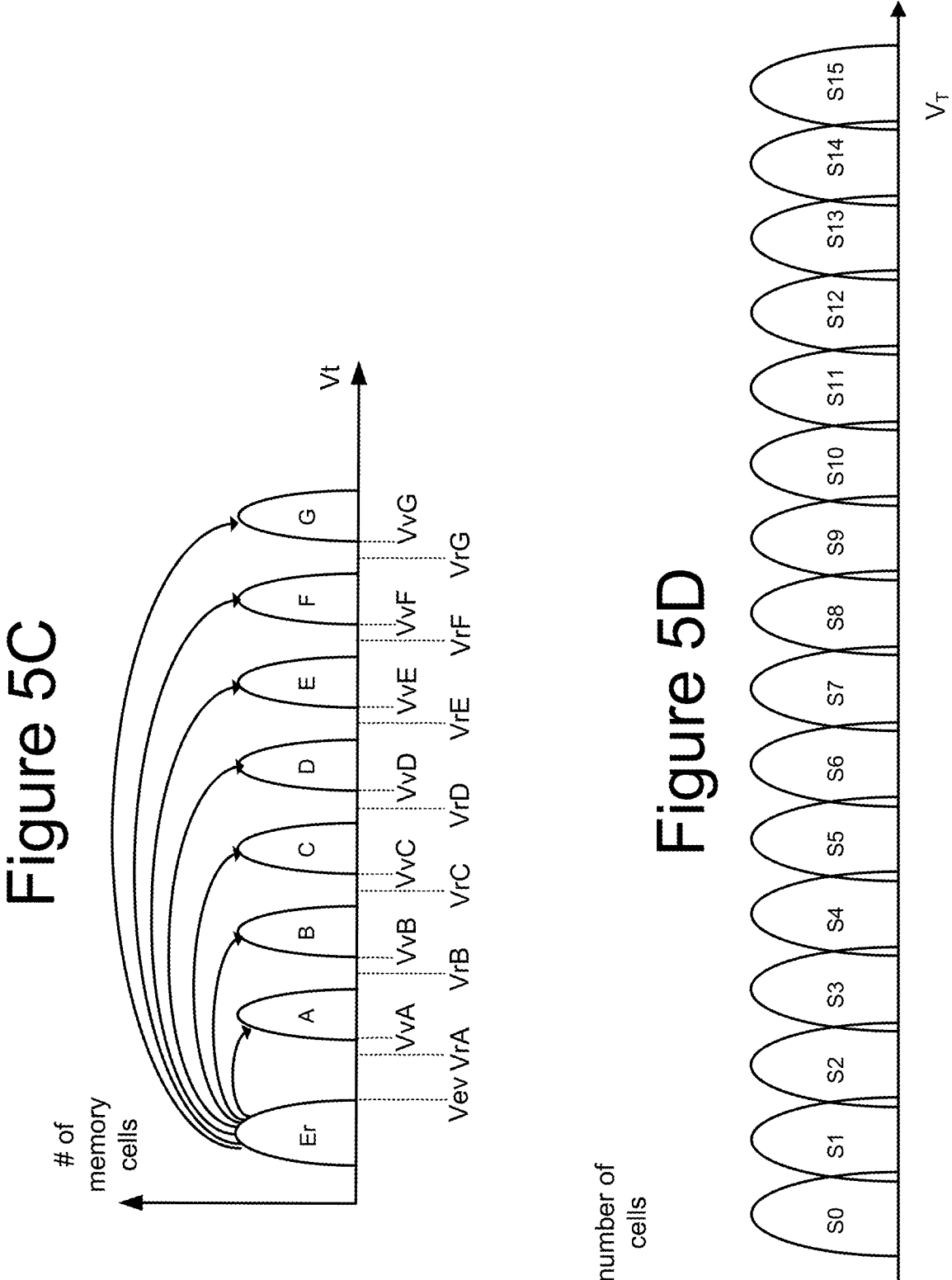
FIG. 5C depicts threshold voltage distributions.
FIG. 5D depicts threshold voltage distributions.

FIGS. 5B-D illustrate example threshold voltage distributions for the memory array when each memory cell stores multiple bit per memory cell data. Memory cells that store multiple bit per memory cell data are referred to as multi-level cells ("MLC"). The data stored in MLC memory cells is referred to as MLC data; therefore, MLC data comprises multiple bits per memory cell. Data stored as multiple bits of data per memory cell is MLC data. In the example embodiment of FIG. 5B, each memory cell stores two bits of data. Other embodiments may use other data capacities per memory cell (e.g., such as three, four, or five bits of data per memory cell).

FIG. 5B shows a first threshold voltage distribution E for erased memory cells. Three threshold voltage distributions A, B and C for programmed memory cells are also depicted. In one embodiment, the threshold voltages in the distribution E are negative and the threshold voltages in distributions A, B and C are positive. Each distinct threshold voltage distribution of FIG. 5B corresponds to predetermined values for the set of data bits. In one embodiment, each bit of data of the two bits of data stored in a memory cell are in different logical pages, referred to as a lower page (LP) and an upper page (UP). In other embodiments, all bits of data stored in a memory cell are in a common logical page. The specific relationship between the data programmed into the memory cell and the threshold voltage levels of the cell depends upon the data encoding scheme adopted for the cells. Table 1 provides an example encoding scheme.

TABLE 1

|  | E | A | B | C |
|---|---|---|---|---|
| LP | 1 | 0 | 0 | 1 |
| UP | 1 | 1 | 0 | 0 |

In one embodiment, known as full sequence programming, memory cells can be programmed from the erased data state E directly to any of the programmed data states A. B or C using the process of FIG. 6 (discussed below). For example, a population of memory cells to be programmed may first be erased so that all memory cells in the population are in erased data state E. Then, a programming process is used to program memory cells directly into data states A, B, and/or C. For example, while some memory cells are being programmed from data state E to data state A, other memory cells are being programmed from data state E to data state B and/or from data state E to data state C. The arrows of FIG. 5B represent the full sequence programming. In some embodiments, data states A-C can overlap, with memory controller 120 (or control die 211) relying on error correction to identify the correct data being stored.

FIG. 5C depicts example threshold voltage distributions for memory cells where each memory cell stores three bits of data per memory cells (which is another example of MLC data). FIG. 5C shows eight threshold voltage distributions, corresponding to eight data states. The first threshold voltage distribution (data state) Er represents memory cells that are erased. The other seven threshold voltage distributions (data states) A-G represent memory cells that are programmed and, therefore, are also called programmed states. Each threshold voltage distribution (data state) corresponds to predetermined values for the set of data bits. The specific relationship between the data programmed into the memory cell and the threshold voltage levels of the cell depends upon the data encoding scheme adopted for the cells. In one embodiment, data values are assigned to the threshold voltage ranges using a Gray code assignment so that if the threshold voltage of a memory erroneously shifts to its neighboring physical state, only one bit will be affected. Table 2 provides an example of an encoding scheme for embodiments in which each bit of data of the three bits of data stored in a memory cell are in different logical pages, referred to as a lower page (LP), middle page (MP) and an upper page (UP).

TABLE 2

|  | Er | A | B | C | D | E | F | G |
|---|---|---|---|---|---|---|---|---|
| UP | 1 | 1 | 1 | 0 | 0 | 0 | 0 | 1 |
| MP | 1 | 1 | 0 | 0 | 1 | 1 | 0 | 0 |
| LP | 1 | 0 | 0 | 0 | 0 | 1 | 1 | 1 |

FIG. 5C shows seven read reference voltages, VrA, VrB, VrC, VrD, VrE, VrF, and VrG for reading data from memory cells. By testing (e.g., performing sense operations) whether the threshold voltage of a given memory cell is above or below the seven read reference voltages, the system can determine what data state (i.e., A, B, C, D, . . . ) a memory cell is in.

FIG. 5C also shows seven verify reference voltages, VvA, VvB, VvC, VvD, VvE, VvF, and VvG. In some embodiments, when programming memory cells to data state A, the system will test whether those memory cells have a threshold voltage greater than or equal to VvA. When programming memory cells to data state B, the system will test whether the memory cells have threshold voltages greater than or equal to VvB. When programming memory cells to data state C, the system will determine whether memory cells have their threshold voltage greater than or equal to VvC. When programming memory cells to data state D, the system will test whether those memory cells have a threshold voltage greater than or equal to VvD. When programming memory cells to data state E, the system will test whether those memory cells have a threshold voltage greater than or equal to VvE. When programming memory cells to data state F, the system will test whether those memory cells have a threshold voltage greater than or equal to VvF. When programming memory cells to data state G, the system will test whether those memory cells have a threshold voltage greater than or equal to VvG. FIG. 5C also shows Vev, which is an erase verify reference voltage to test whether a memory cell has been properly erased.

In an embodiment that utilizes full sequence programming, memory cells can be programmed from the erased data state Er directly to any of the programmed data states A-G using the process of FIG. 6 (discussed below). For example, a population of memory cells to be programmed may first be erased so that all memory cells in the population are in erased data state Er. Then, a programming process is used to program memory cells directly into data states A, B, C, D, E, F, and/or G. For example, while some memory cells are being programmed from data state Er to data state A, other memory cells are being programmed from data state Er to data state B and/or from data state Er to data state C, and so on. The arrows of FIG. 5C represent the full sequence programming. In some embodiments, data states A-G can overlap, with control die 211 and/or memory controller 120 relying on error correction to identify the correct data being stored. Note that in some embodiments, rather than using full sequence programming, the system can use multi-pass programming processes known in the art.

In general, during verify operations and read operations, the selected word line is connected to a voltage (one example of a reference signal), a level of which is specified for each read operation (e.g., see read reference voltages VrA, VrB, VlC, VrD, VrE, VrF, and VrG, of FIG. 5C) or verify operation (e.g. see verify reference voltages VvA, VvB, VvC, VvD, VvE, VvF, and VvG of FIG. 5C) in order to determine whether a threshold voltage of the concerned memory cell has reached such level. After applying the word line voltage, the conduction current of the memory cell is measured to determine whether the memory cell turned on (conducted current) in response to the voltage applied to the word line. If the conduction current is measured to be greater than a certain value, then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell. During a read or verify process, the unselected memory cells are provided with one or more read pass voltages (also referred to as bypass voltages) at their control gates so that these memory cells will operate as pass gates (e.g., conducting current regardless of whether they are programmed or erased).

There are many ways to measure the conduction current of a memory cell during a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for verifying/reading. Other read and verify techniques known in the art can also be used.

FIG. 5D depicts threshold voltage distributions when each memory cell stores four bits of data, which is another example of MLC data. FIG. 5D depicts that there may be some overlap between the threshold voltage distributions (data states) S0-S15. The overlap may occur due to factors such as memory cells losing charge (and hence dropping in threshold voltage). Program disturb can unintentionally increase the threshold voltage of a memory cell. Likewise, read disturb can unintentionally increase the threshold voltage of a memory cell. Over time, the locations of the threshold voltage distributions may change. Such changes can increase the bit error rate, thereby increasing decoding time or even making decoding impossible. Changing the read reference voltages can help to mitigate such effects. Using ECC during the read process can fix errors and ambiguities. Note that in some embodiments, the threshold voltage distributions for a population of memory cells storing four bits of data per memory cell do not overlap and are separated from each other. The threshold voltage distributions of FIG. 5D will include read reference voltages and verify reference voltages, as discussed above.

When using four bits per memory cell, the memory can be programmed using the full sequence programming discussed above, or multi-pass programming processes known in the art. Each threshold voltage distribution (data state) of FIG. 5D corresponds to predetermined values for the set of data bits. The specific relationship between the data programmed into the memory cell and the threshold voltage levels of the cell depends upon the data encoding scheme adopted for the cells. Table 3 provides an example of an encoding scheme for embodiments in which each bit of data of the four bits of data stored in a memory cell are in different logical pages, referred to as a lower page (LP), middle page (MP), an upper page (UP) and top page (TP).

TABLE 3

|    | S0 | S1 | S2 | S3 | S4 | S5 | S6 | S7 | S8 | S9 | S10 | S11 | S12 | S13 | S14 | S15 |
|----|----|----|----|----|----|----|----|----|----|----|-----|-----|-----|-----|-----|-----|
| TP | 1  | 1  | 1  | 1  | 1  | 0  | 0  | 0  | 0  | 0  | 1   | 1   | 0   | 0   | 0   | 1   |
| UP | 1  | 1  | 0  | 0  | 0  | 0  | 0  | 0  | 1  | 1  | 1   | 1   | 1   | 1   | 0   | 0   |
| MP | 1  | 1  | 1  | 0  | 0  | 0  | 0  | 1  | 1  | 0  | 0   | 0   | 0   | 1   | 1   | 1   |
| LP | 1  | 0  | 0  | 0  | 1  | 1  | 0  | 0  | 0  | 0  | 0   | 1   | 1   | 1   | 1   | 1   |

60

Figure 6:
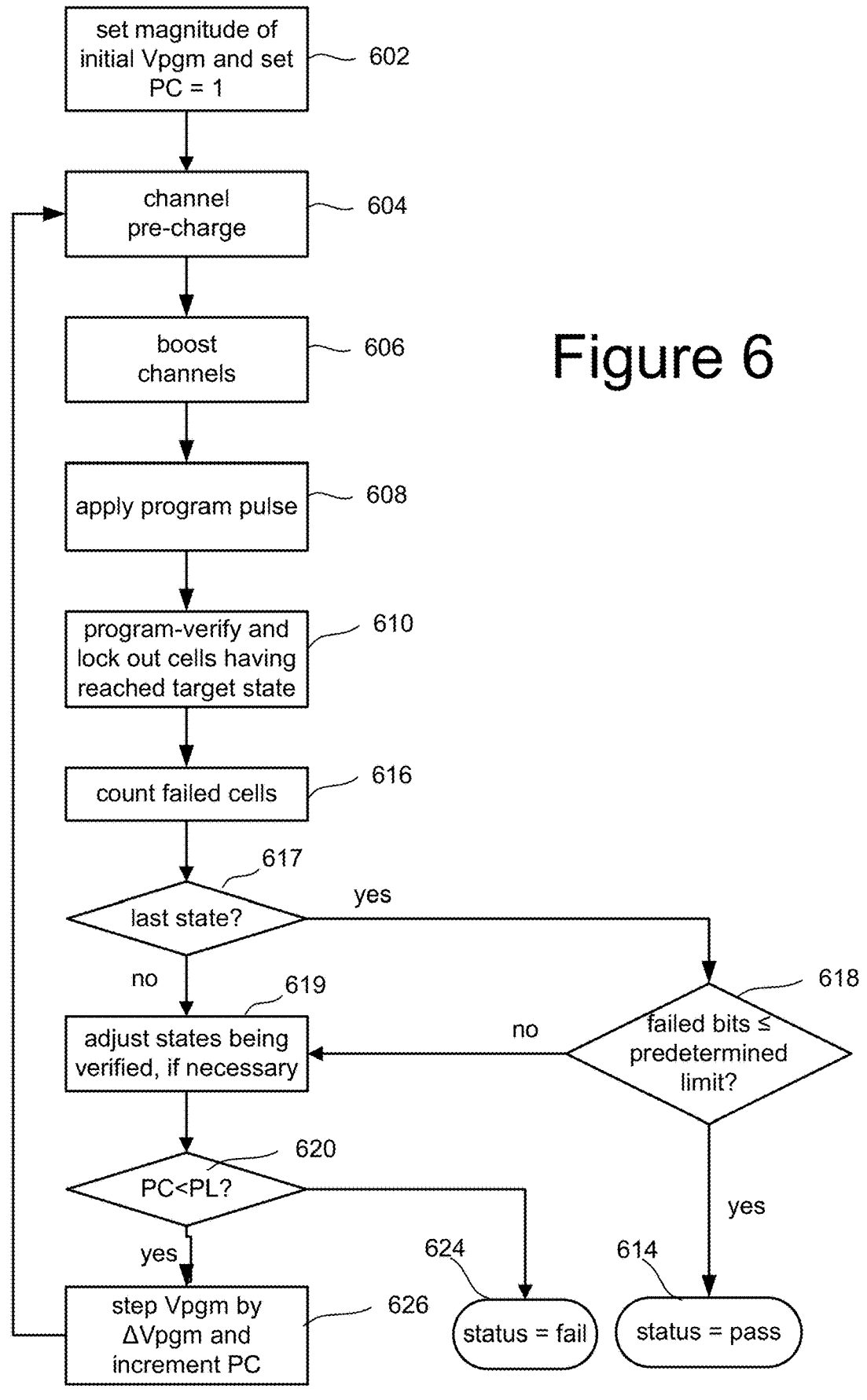
FIG. 6 is a flow chart describing one embodiment of a process for programming non-volatile memory.

FIG. 6 is a flowchart describing one embodiment of a process for programming memory cells. For purposes of this document, the term program and programming are synonymous with write and writing. In one example embodiment, the process of FIG. 6 is performed for memory array 202 using the one or more control circuits (e.g., system control logic 260, column control circuitry 210, row control circuitry 220) discussed above. In one example embodiment, the process of FIG. 6 is performed by integrated memory assembly 207 using the one or more control circuits (e.g., system control logic 260, column control circuitry 210, row control circuitry 220) of control die 211 to program memory cells on memory die 201. The process includes multiple loops, each of which includes a program phase and a verify phase. The process of FIG. 6 is performed to implement the full sequence programming, as well as other programming schemes including multi-stage programming. When implementing multi-stage programming, the process of FIG. 6 is used to implement any/each stage of the multi-stage programming process.

Typically, the program voltage applied to the control gates (via a selected data word line) during a program operation is applied as a series of program voltage pulses. Between program voltage pulses are a set of verify pulses (e.g., voltage pulses) to perform verification. In many implementations, the magnitude of the program voltage pulses is increased with each successive pulse by a predetermined step size. In step 602 of FIG. 6, the programming voltage signal (Vpgm) is initialized to the starting magnitude (e.g., ~12-16V or another suitable level) and a program counter PC maintained by state machine 262 is initialized at 1. In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming. To assist in the boosting, in step 604 the control die will pre-charge channels of NAND strings that include memory cells connected to the selected word line that are to be inhibited from programming. In step 606, NAND strings that include memory cells connected to the selected word line that are to be inhibited from programming have their channels boosted to inhibit programming. Such NAND strings are referred to herein as "unselected NAND strings." In one embodiment, the unselected word lines receive one or more boosting voltages (e.g., ~7-11 volts) to perform boosting schemes. A program inhibit voltage is applied to the bit lines coupled with the unselected NAND string.

In step 608, a program voltage pulse of the programming voltage signal Vpgm is applied to the selected word line (the word line selected for programming). If a memory cell on a NAND string should be programmed, then the corresponding bit line is biased at a program enable voltage. In step 608, the program pulse is concurrently applied to all memory cells connected to the selected word line so that all of the memory cells connected to the selected word line are programmed concurrently (unless they are inhibited from programming). That is, they are programmed at the same time or during overlapping times (both of which are considered concurrent). In this manner all of the memory cells connected to the selected word line will concurrently have their threshold voltage change, unless they are inhibited from programming.

In step 610, program-verify is performed, which includes testing whether memory cells being programmed have successfully reached their target data state. Memory cells that have reached their target states are locked out from further programming by the control die. Step 610 includes performing verification of programming by sensing at one or more verify reference levels. In one embodiment, the verification process is performed by testing whether the threshold voltages of the memory cells selected for programming have reached the appropriate verify reference voltage. In step 610, a memory cell may be locked out after the memory cell has been verified (by a test of the Vt) that the memory cell has reached its target state.

In one embodiment of step 610, a smart verify technique is used such that the system only verifies a subset of data states during a program loop (steps 604-628). For example, the first program loop includes verifying for data state A (see FIG. 5C), depending on the result of the verify operation the second program loop may perform verify for data states A and B, depending on the result of the verify operation the third program loop may perform verify for data states B and C, and so on.

In step 616, the number of memory cells that have not yet reached their respective target threshold voltage distribution are counted. That is, the number of memory cells that have, so far, failed to reach their target state are counted. This counting can be done by state machine 262, memory controller 120, or another circuit. In one embodiment, there is one total count, which reflects the total number of memory cells currently being programmed that have failed the last verify step. In another embodiment, separate counts are kept for each data state.

In step 617, the system determines whether the verify operation in the latest performance of step 610 included verifying for the last data state (e.g., data state G of FIG. 5C). If so, then in step 618, it is determined whether the count from step 616 is less than or equal to a predetermined limit. In one embodiment, the predetermined limit is the number of bits that can be corrected by error correction codes (ECC) during a read process for the page of memory cells. If the number of failed cells is less than or equal to the predetermined limit, then the programming process can stop and a status of "PASS" is reported in step 614. In this situation, enough memory cells programmed correctly such that the few remaining memory cells that have not been completely programmed can be corrected using ECC during the read process. In some embodiments, the predetermined limit used in step 618 is below the number of bits that can be corrected by error correction codes (ECC) during a read process to allow for future/additional errors. When programming less than all of the memory cells for a page, the predetermined limit can be a portion (pro-rata or not pro-rata) of the number of bits that can be corrected by ECC during a read process for the page of memory cells. In some embodiments, the limit is not predetermined. Instead, it changes based on the number of errors already counted for the page, the number of program-erase cycles performed or other criteria.

If in step 617 it was determined that the verify operation in the latest performance of step 610 did not include verifying for the last data state or in step 618 it was determined that the number of failed memory cells is not less than the predetermined limit, then in step 619 the data states that will be verified in the next performance of step 610 (in the next program loop) is adjusted as per the smart verify scheme discussed above. In step 620, the program counter PC is checked against the program limit value (PL). Examples of program limit values include 6, 12, 16, 19, 20 and 30; however, other values can be used. If the program counter PC is not less than the program limit value PL, then the program process is considered to have failed and a status of FAIL is reported in step 624. If the program counter PC is less than the program limit value PL, then the process continues at step 626 during which time the Program Counter PC is incremented by 1 and the programming voltage signal Vpgm is stepped up to the next magnitude. For example, the next pulse will have a magnitude greater than the previous pulse by a step size ΔVpgm (e.g., a step size of 0.1-1.0 volts). After step 626, the process continues at step 604 and another program pulse is applied to the selected word line (by the control die) so that another program loop (steps 604-626) of the programming process of FIG. 6 is performed.

In one embodiment memory cells are erased prior to programming. Erasing is the process of changing the threshold voltage of one or more memory cells from a programmed data state to an erased data state. For example, changing the threshold voltage of one or more memory cells from state P to state E of FIG. 5A, from states A/B/C to state E of FIG. 5B, from states A-G to state Er of FIG. 5C or from states S1-S15 to state S0 of FIG. 5D.

One technique to erase memory cells in some memory devices is to bias a p-well (or other types of) substrate to a high voltage to charge up a NAND channel. An erase enable voltage (e.g., a low voltage) is applied to control gates of memory cells while the NAND channel is at a high voltage to erase the memory cells. Herein, this is referred to as p-well erase.

Another approach to erasing memory cells is to generate gate induced drain leakage ("GIDL") current to charge up the NAND string channel. An erase enable voltage is applied to control gates of the memory cells, while maintaining the NAND string channel potential to erase the memory cells. Herein, this is referred to as GIDL erase. Both p-well erase and GIDL erase may be used to lower the threshold voltage (Vt) of memory cells.

In one embodiment, the GIDL current is generated by causing a drain-to-gate voltage at a GIDL generation transistor (e.g., transistors connected to SGDT0, SGDT1, SGSB0 and SGSB1). In some embodiments, a select gate (e.g., SGD or SGS) can be used as a GIDL generation transistor. A transistor drain-to-gate voltage that generates a GIDL current is referred to herein as a GIDL voltage. The GIDL current may result when the GIDL generation transistor drain voltage is significantly higher than the GIDL generation transistor control gate voltage. GIDL current is a result of carrier generation, i.e., electron-hole pair generation due to band-to-band tunneling and/or trap-assisted generation. In one embodiment, GIDL current may result in one type of carriers (also referred to a charge carriers), e.g., holes, predominantly moving into the NAND channel, thereby raising or changing the potential of the channel. The other type of carriers, e.g., electrons, are extracted from the channel, in the direction of a bit line or in the direction of a source line, by an electric field. During erase, the holes may tunnel from the channel to a charge storage region of the memory cells (e.g., to charge trapping layer 493) and recombine with electrons there, to lower the threshold voltage of the memory cells.

The GIDL current may be generated at either end (or both ends) of the NAND string. A first GIDL voltage may be created between two terminals of a GIDL generation transistor (e.g., connected to SGDT0, SGDT1) that is connected to or near a bit line to generate a first GIDL current. A second GIDL voltage may be created between two terminals of a GIDL generation transistor (e.g., SGSB0, SGSB1) that is connected to or near a source line to generate a second GIDL current. Erasing based on GIDL current at only one end of the NAND string is referred to as a one-sided GIDL erase. Erasing based on GIDL current at both ends of the NAND string is referred to as a two-sided GIDL erase. The technology described herein can be used with one-sided GIDL erase and two-sided GIDL erase.

Figure 7:
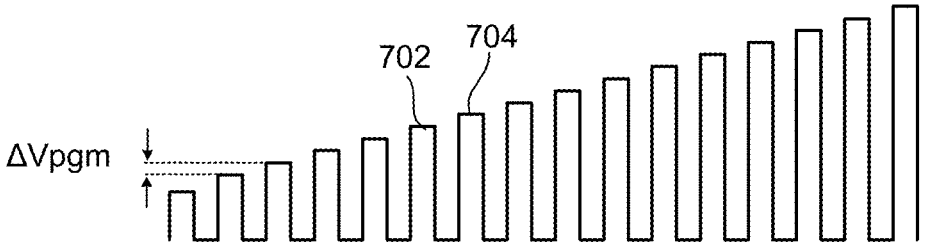
FIG. 7 depicts a voltage signal applied to a selected word line during programming.
Figures 8A, 8B:
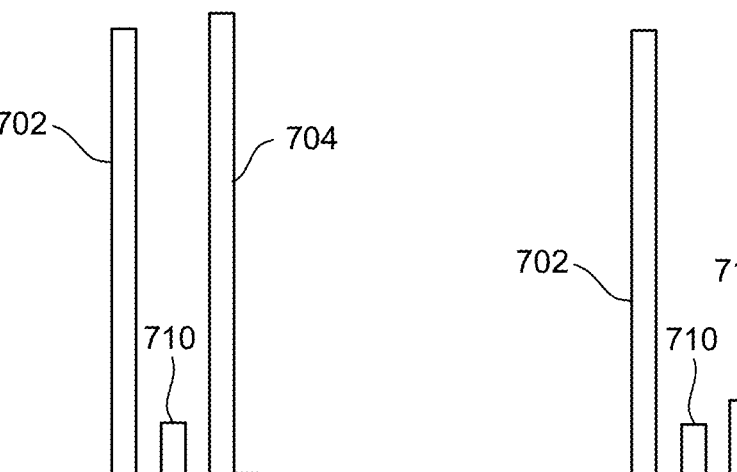
FIG. 8A depicts two program voltage pulses applied to a selected word line during programming and a verify voltage pulse between the two program voltage pulses.
FIG. 8B depicts two program voltage pulses applied to a selected word line during programming and a verify voltage pulse between the two program voltage pulses.

FIG. 7 depicts the programming signal Vpgm as a series of program voltage pulses, such that one pulse of the programming signal Vpgm is applied at each performance of step 608 of FIG. 6. These program voltage pulses are one example of doses of programming applied to a plurality of non-volatile memory cells being programmed. In one embodiment, the program voltage pulses increase in voltage magnitude from pulse-to-pulse by a step size ΔVpgm. In some embodiments, ΔVpgm can change during a programming process. As described by FIG. 6, the system performs program-verification between the doses of programming (between or after programming voltage pulses), as depicted in FIGS. 8A and 8B. FIG. 8A, which illustrates an example in which program-verify is performed for one verify level, depicts two of the programming voltage pulses 702 and 704 of FIG. 7. Between programming voltage pulses 702 and 704 is verify voltage pulse 710. In one embodiment, verify voltage pulse 710 has a magnitude of any of the verify reference voltages VvA, VvB, VvC, VvD, VvE, VvF, and VvG (see FIG. 5C) and represents the system performing program-verify (step 610) between the doses of programming (successive iterations of step 608). In some embodiments, between programming voltage pulses the system will perform program-verify for multiple or all data states, while in other embodiments, the system will perform program-verify for one data state or a subset of data states.

FIG. 8B, which illustrates an example in which program-verify is performed for two data states, depicts two of the programming voltage pulses 702 and 704 of FIG. 7. Between programming voltage pulses 702 and 704 are verify voltage pulses 710 and 712. In one embodiment, verify voltage pulses 710 and 712 are for different data states. In other embodiments, there can be more than two verify voltage pulses between programming voltage pulses 702 and 704.

In prior art systems, the unit of erase is a block. However, there are instances when only a sub-block needs to be erased (e.g., because a file that is stored in only a sub-block needs to be erased). If only a sub-block needs to be erased it is more efficient to only erase the sub-block rather than the block. For example, only erasing a sub-block (rather than an entire block) saves time having to move valid data from the block to another block prior to the erase and saves the memory cells in the unselected sub-blocks from having to endure the stress of the erase process (which improves system endurance).

Figure 9:
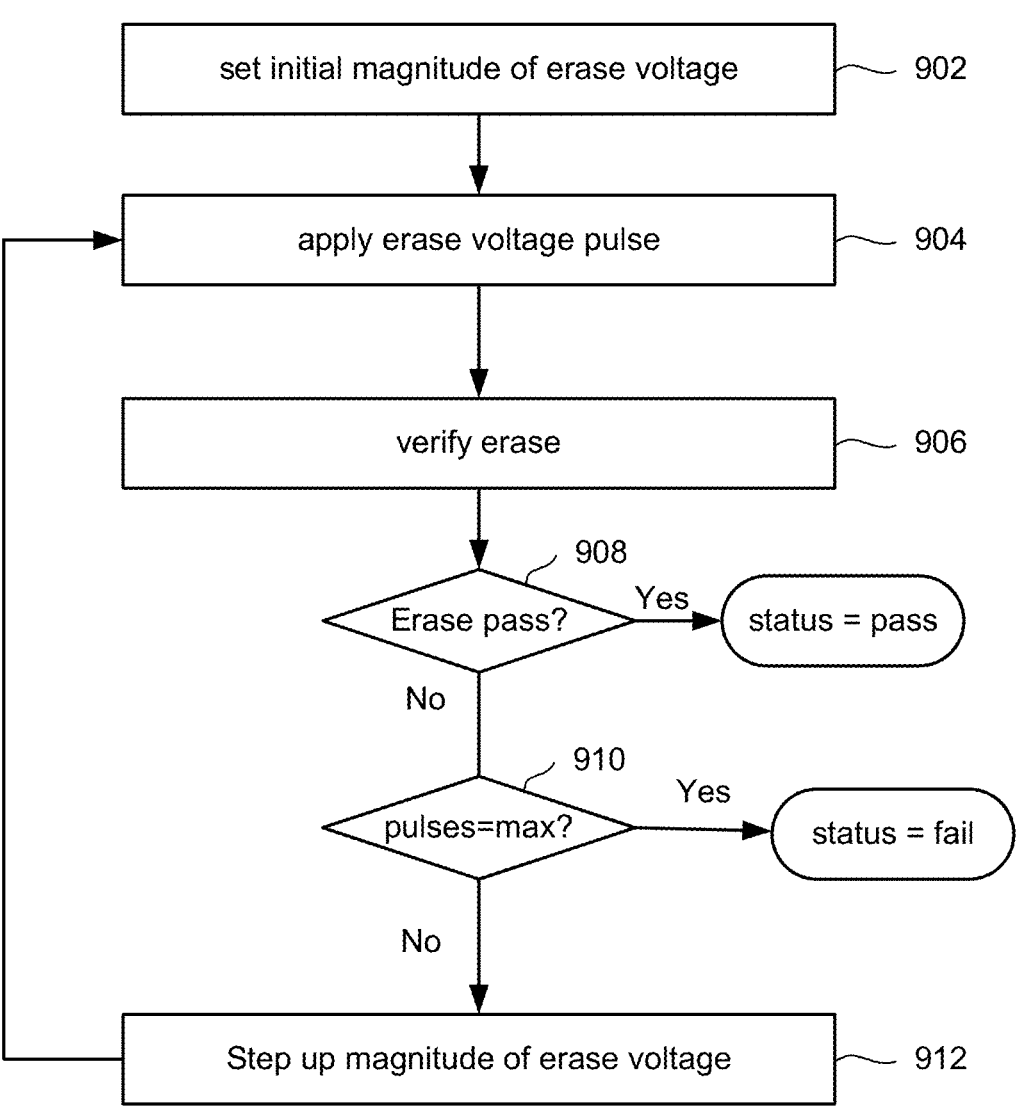
FIG. 9 is a flow chart describing one embodiment of a process for erasing non-volatile memory cells of a sub-block.

FIG. 9 is a flowchart describing one embodiment of a process for erasing memory cells of a sub-block. In one embodiment, the process of FIG. 9 can be performed by any one of the one or more control circuits discussed above. The process of FIG. 9 can be performed entirely by a control circuit on memory die 200 (see FIG. 2A) or entirely by a control circuit on integrated memory assembly 207 (see FIG. 2B), rather than by memory controller 120. In one example, the process of FIG. 9 is performed by or at the direction of state machine 262, using other components of System Control Logic 260, Column Control Circuitry 210 and Row Control Circuitry 220. In another embodiment, the process of FIG. 9 is performed by or at the direction of memory controller 120. The process of FIG. 9 can be performed on a memory implementing any of the structures depicted in FIGS. 1-4H, or other memory structures.

Step 902 of FIG. 9 includes setting an initial magnitude of an erase voltage that can be applied to the source line SL, bit lines or other signal lines. The initial erase voltage may have a relatively large magnitude such as, for example, 18v. In some embodiment, the erase voltage is applied as a voltage pulse (erase voltage pulse). Step 904 includes applying the erase voltage pulse (or other waveform) to the source line and/or bit lines connected to the NAND strings in the selected block. Step 904 also includes applying erase support voltages (see e.g., FIG. 11) to other signal lines to enable GIDL erase in the selected sub-block of the selected block while preventing GIDL erase in the one or more unselected sub-blocks of the selected block.

In step 906, erase verify may be performed. The erase verify operation may apply for example VeV (See FIG. 5C) to each data word line (e.g., WL0-WL161) in the block. If all memory cells in the sub-block on a given NAND string have a Vt below VeV then the NAND string will conduct a significant current. In some embodiments, if a NAND string passes, erase of the NAND string may end at this point. Step 908 is a determination of whether erase is complete (status=pass) because all or enough NAND strings passed erase verify. If not, the system determines (in step 910) whether the maximum number of erase voltage pulses have been applied. If so, then the erase process has failed. If less than the maximum number of erase voltage pulses have been applied then the magnitude of the erase voltage may (optionally) be increased in step 912 and steps 904-910 are repeated.

FIG. 10A is a flow chart describing one embodiment of a process performed during erasing of non-volatile memory cells in a sub-block. In one embodiment, the process of FIG. 10A is performed during step 904 of FIG. 9. In another embodiment, the process of FIG. 10A is performed without being part of the process of FIG. 9. In another embodiment, the process of FIG. 9 is performed according to the process of FIG. 10A. In one embodiment, the process of FIG. 10A can be performed by any one of the one or more control circuits discussed above. The process of FIG. 10A can be performed entirely by a control circuit on memory die 200 (see FIG. 2A) or entirely by a control circuit on integrated memory assembly 207 (see FIG. 2B), rather than by memory controller 120. In one example, the process of FIG. 10A is performed by or at the direction of state machine 262, using other components of System Control Logic 260, Column Control Circuitry 210 and Row Control Circuitry 220. In another embodiment, the process of FIG. 10A is performed by or at the direction of memory controller 120. The process of FIG. 10A can be performed on a memory implementing any of the structures depicted in FIGS. 1-4H, or other memory structures.

Step 1002 of FIG. 10A includes erasing a selected sub-block of a selected block without erasing one or more unselected sub-blocks of the selected block. For example, assume sub-block SB1 is selected for erasing (see FIG. 4F) and sub-blocks SB0, SB2, and SB3 are unselected sub-blocks for this erase operation. Then the erase process will erase the memory cells of SB1 without erasing the memory cells of sub-blocks SB0, SB2, and SB3. In one embodiment, step 1002 comprises causing GIDL at the source side of the selected sub-block of the selected block (step 1004) and inhibiting GIDL at the source side of the one or more unselected sub-blocks of the selected block (step 1006). In some embodiments, step 1004 is performed concurrently with step 1006. GIDL is caused or inhibited at the source side separately/independently for each of the sub-blocks due to separate SGS0-$s0$, SGS1-$s0$, SGSB0-$s0$, SGSB1-$s0$, SGS0-$s1$, SGS1-$s1$, SGSB0-$s1$, SGSB1-$s1$, SGS0-$s2$, SGS1-$s2$, SGSB0-$s2$, SGSB1-$s2$, SGS0-$s3$, SGS1-$s3$, SGSB0-$s3$, and SGSB1-$s3$. Because all word lines connected to the selected block are connected to the selected sub-block of the selected block and the one or more unselected sub-blocks of the selected block (each word line of the set of word lines is connected to all sub-blocks of the selected block), the control circuit is configured to apply the same word line voltages for the selected sub-block of the selected block and the one or more unselected sub-blocks of the selected block.

One embodiment further includes erasing the selected sub-block of the selected block without erasing one or more unselected sub-blocks of the selected block by also causing GIDL at the bit line side of the selected sub-block of the selected block while inhibiting GIDL at the bit line side of the one or more unselected sub-blocks of the selected block. GIDL is caused or inhibited at the bit line side separately/independently for each of the sub-blocks due to separate SGD0-$s0$, SGD1-$s0$, SGDT0-$s0$, SGDT1-$s0$, SGD0-$s1$, SGD1-$s1$, SGDT0-$s1$, SGDT1-$s1$, SGD0-$s2$, SGD1-$s2$, SGDT0-$s2$, SGDT1-$s2$, SGD0-$s3$, SGD1-$s3$, SGDT0-$s3$, and SGDT1-$s3$. In this embodiment, each sub-block includes multiple source side GIDL generation transistors (e.g., SGSB0, SGSB1) that are closer to the source line than the bit lines, and each sub-block includes multiple bit line side GIDL generation transistors (e.g., SGDT0, SGDT1) that are closer to the bit lines than the source line.

FIG. 10B is a flow chart describing one embodiment of a process performed during erasing of non-volatile memory cells in a sub-block. In one embodiment, the process of FIG. 10B is performed during step 904 of FIG. 9. In another embodiment, the process of FIG. 10B is performed without being part of the process of FIG. 9. In another embodiment, the process of FIG. 9 is performed according to the process of FIG. 10B. In one embodiment, the process of FIG. 10B is an example implementation of the process of FIG. 10A.

In one embodiment, the process of FIG. 10B can be performed by any one of the one or more control circuits discussed above. The process of FIG. 10B can be performed entirely by a control circuit on memory die 200 (see FIG. 2A) or entirely by a control circuit on integrated memory assembly 207 (see FIG. 2B), rather than by memory controller 120. In one example, the process of FIG. 10B is performed by or at the direction of state machine 262, using other components of System Control Logic 260, Column Control Circuitry 210 and Row Control Circuitry 220. In another embodiment, the process of FIG. 10B is performed by or at the direction of memory controller 120. The process of FIG. 10B can be performed on a memory implementing any of the structures depicted in FIGS. 1-4H, or other memory structures.

Step 1050 of FIG. 10B comprises applying an erase voltage to the source line and the bit lines. Step 1052 includes applying a GIDL enable voltage to source side GIDL generation transistors and bit line side GIDL generation transistors in a selected sub-block of a selected block. Step 1054 includes applying a GIDL inhibit voltage to source side GIDL generation transistors and bit line side GIDL generation transistors in the one or more unselected sub-blocks of the selected block such that memory cells of the selected sub-block of the selected block experience GIDL based erasing due to GIDL generation by the source side GIDL generation transistors and bit line side GIDL generation transistors in the selected sub-block of the selected block while memory cells in the one or more unselected sub-blocks of the selected block are inhibited from GIDL based erasing. One embodiment of a structure that can perform the method of FIG. 10B includes a non-volatile memory structure comprising non-volatile memory cells grouped into blocks such that each block includes multiple sub-blocks, bit lines connected to the blocks, a source line connected to the blocks, and a set of word lines connected to the all of the sub-blocks of all of the blocks. Each sub-block includes multiple source side GIDL genera-tion transistors that are closer to the source line than the bit lines and multiple bit line side GIDL generation transistors that are closer to the bit lines than the source lines.

Figure 11:
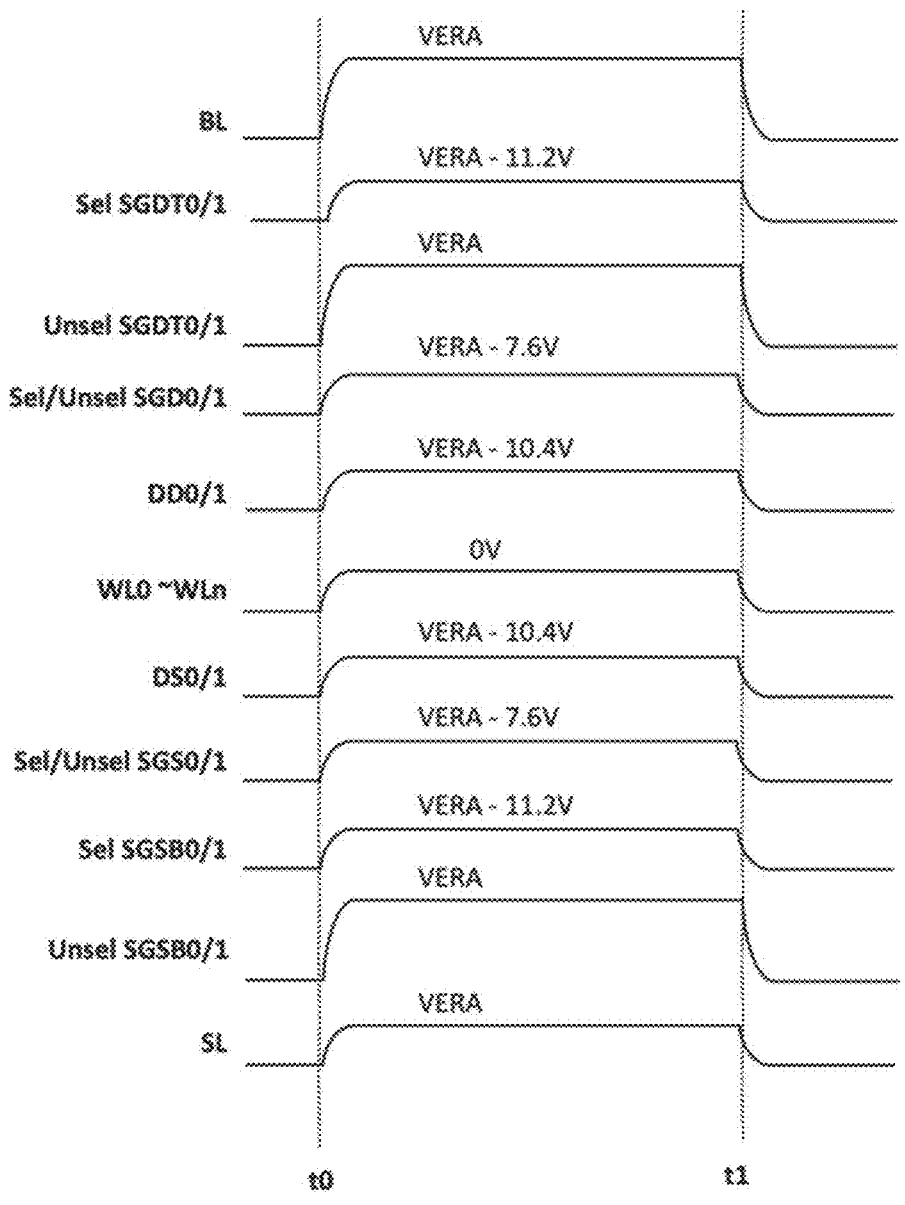
FIG. 11 is a signal timing diagram describing one embodiment of a process performed during erasing.

FIG. 11 is a signal timing diagram describing one embodi-ment of a process performed during erasing of non-volatile memory cells in a sub-block. The process depicted in FIG. 11 is an example implementation of step 904 of FIG. 9. The process depicted in FIG. 11 is also an example implemen-tation of the process of FIG. 10A and an example imple-mentation of the process of FIG. 10B. FIG. 11 describes the following signals: BL, Sel SGDT0/1, Unsel SGDT0/1, Sel/Unsel SGD0/1, DD0/1, WL0~WLn, DS0/1, Sel/Unsel SGS0/1, Unsel SGSB0/1, Sel SGSB0/1 and SL. The signal BL is the voltage applied to all of the bit lines connected to the block. The signal Sel SGDT0/1 is the voltage applied to SGDT0 and SGDT1 for the sub-block selected for erasing. For example, if sub-block SB1 is selected for erasing, then Sel SGDT0/1 is the voltage applied to SGDT0-$s1$ and SGDT1-$s1$. The signal Unsel SGDT0/1 is the voltage applied to SGDT0 and SGDT1 for the sub-blocks that are not selected for erasing. For example, if sub-block SB1 is selected for erasing, then Unsel SGDT0/1 is the voltage applied to SGDT0-$s0$, SGDT1-$s0$, SGDT0-$s2$, SGDT1-$s2$, SGDT0-$s3$, and SGDT1-$s3$. The signal Sel/Unsel SGD0/1 is the voltage applied to SGD0 and SGD1 for all sub-blocks of the selected block. Therefore, Sel/Unsel SGD0/1 is the voltage applied to SGD0-$s0$, SGD1-$s0$, SGD0-$s1$, SGD1-$s1$, SGD0-$s2$, SGD1-$s2$, SGD0-$s3$, and SGD1-$s3$. The signal DD0/1 is the voltage applied to DD0 and DD1. The signal WL0~WLn is the voltage applied to WL0-WL161. The signal DS0/1 is the voltage applied to DS0 and DS1. The signal Sel/Unsel SGS0/1 is the voltage applied to SGS0 and SGS1 for all sub-blocks of the selected block. Therefore, Sel/Unsel SGS0/1 is the voltage applied to SGS0-$s0$, SGS1-$s0$, SGS0-$s1$, SGS1-$s1$, SGS0-$s2$, SGS1-$s2$, SGS0-$s3$, and SGS1-$s3$. The signal SL is the voltage applied to the source line SL. The signal Unsel SGSB0/1 is the voltage applied to SGSB0 and SGSB1 for the sub-blocks that are not selected for erasing. For example, if sub-block SB1 is selected for erasing, then Unsel SGSB0/1 is the voltage applied to SGSB0-$s0$, SGSB1-$s0$, SGSB0-$s2$, SGSB1-$s2$, SGSB0-$s3$, and SGSB1-$s3$. The signal Sel SGSB0/1 is the voltage applied to SGSB0 and SGSB1 for the sub-block selected for erasing. For example, if sub-block SB1 is selected for erasing, then Sel SGSB0/1 is the voltage applied to SGSB0-$s1$ and SGSB1-$s1$.

All signals start at Vss (ground or 0v). At time t0, BL and SL are raised to VERA (e.g., 18 volts). VERA is an example of the erase voltage. Although FIG. 11 shows VERA applied to BL and SL as a voltage pulse, other waveforms can also be used. Also at time t0, Sel SGDT0/1 is raised to VERA-11.2v, Unsel SGDT0/1 is raised to VERA, Sel/Unsel SGD0/1 is raised to VERA-7.6v, DD0/1 is raised to VERA-10.4v, WL0~WLn remains at 0v (or close to 0v), DS0/1 is raised to VERA-10.4v, Sel/Unsel SGS0/1 is raised to VERA-7.6v, Unsel SGSB0/1 is raised to VERA, and Sel SGSB0/1 is raised to VERA-11.2v.

In some embodiments, two conditions need to be met for GIDL to occur: (1) a high voltage (e.g., VERA) needs to be on BL and/or SL and (2) SGDT and/or SGSB needs to be low enough (e.g., VERA-11.2V). Thus, Sel SGSB0/1 (source side, as per steps 1004 and 1052) and Sel SGDT0/1 (bit line side) are raised to VERA-11.2v. To inhibit GIDL, Unsel SGSB0/1 (source side, as per steps 1006 and 1054) and Unsel SGDT0/1 (bit line side) are raised to VERA. Between t0 and t1, the memory cells in the selected sub-block experience an erase voltage pulse that lowers their threshold voltage toward the erased state. At time t1, all signals are lowered to Vss (ground or 0v). Note that the GIDL enable voltage (e.g., VERA-11.2v applied to Sel SGSB0/1 and Sel SGDT0/1) is lower in voltage magnitude than the GIDL inhibit voltage (VERA-applied to Unsel SGSB0/1 and Unsel SGDT0/1) and the erase voltage (VERA applied to SL and BL).

Figure 12:
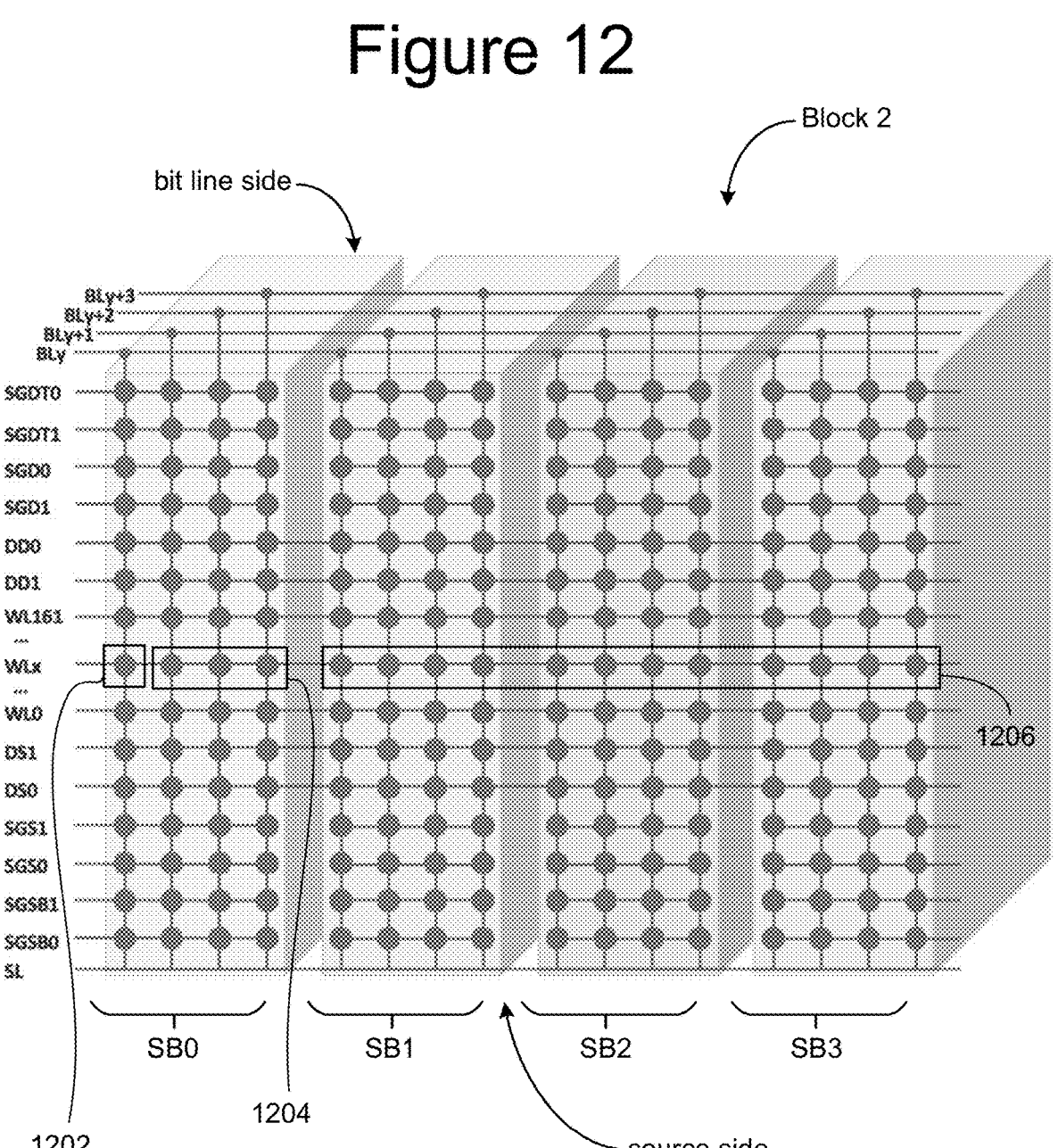
FIG. 12 is a block diagram depicting a block divided into sub-blocks.

In addition to separately and independently erasing sub-blocks, sub-blocks may also be separately and indepen-dently programmed. For example, FIG. 12 shows Block 2 with the intention of programming sub-block SB0 without programming data into the other sub-blocks (SB1, SB2, SB3) of the selected Block 2. As described above, the programming process of FIG. 6 concurrently programs data into multiple memory cells connected to a common word line. In the example of FIG. 12, data is being programmed into memory cells of SB0 connected to word line WLx. Due to the data pattern being programmed, some memory cells of SB0 connected to word line WLx will be programmed (see e.g., box 1202) and some memory cells of SB0 connected to word line WLx will be inhibited from programming (see e.g., box 1204). All memory cells of SB1/SB2/SB3 con-nected to word line WLx will be inhibited from program-ming (see e.g., box 1206).

In a NAND memory structure, such as that described above, the memory cells are programmed and erased to write and delete data by the threshold voltage Vth of the memory cells by storing charge in the charge storage region along a memory hole. In embodiments like those presented above, the select gates can also have a programmable threshold voltage. These select gate threshold voltages are typically programmed in before the memory device is put into use for storing data, but for some embodiments in some circum-stances, the select gate may undergo reprogramming. The main application of select gate programming is to act as a counter-measure to select gate Vth upshift or downshift that can occur over the endurance of the memory device due to disturb from the operation of the memory device, which can particularly occur during sub-block mode operations. As with the memory cells of a NAND memory, prior to repro-gramming select gates, they need to be erased. In a standard block erase of a NAND memory such as described above, the data word lines of a block are biased for erase and the select gate control lines are erase inhibited. To reprogram the select gates, the entire block, both data word lines and select gate control lines, are biased for a block erase, resulting in data loss for the entire block. To avoid this and allow for the erasure of the drain side select gates while maintaining the data content of a block, the following discussion presents a mechanism that uses the GIDL erase scheme from the bit line region through charge coupled hole injection into the drain side select gates for controlled erase of the drain side select gates while maintaining the data integrity of the block for future use. Following the controlled drain side select gate erase, the drain side select gate can be reprogrammed using a typical select gate program sequence, similar to that for a selected word line but for the corresponding select gate control line.

The use of drain side select gate erase can also be used for data encryption. Some memory systems require secure erase and data corruption before erasing the block. One specific requirement from such a system is that any read on that block must lead to an uncorrectable error correction code (UECC) result. This requirement is typically done by performing what is known as "flash fill" that programs the entire block with a programming pulse that corrupts the existing data in the block. Although this serves the secure erase and data corruption purpose, it also renders the data in the block as permanently irretrievable. The drain side select gate erase mechanism presented here provides a scheme where any read would result in UECC, but also, in case the data is required to be retrieved at a later stage, allows for this to be made possible.

The following embodiments use a 3-phase drain side select gate (SGD) erase scheme. Enabling SGD erase will keep the programmed content on the data word lines intact. The technique will be described with respect to the example embodiment of FIGS. 4-4H, and will specifically refer to FIG. 4C that includes two drain side select gates SGD0 and SGD1 and two drain side GIDL generation transistor layers SGDT0 and SGDT1. Phase 1 is GIDL hole generation at SGDT. Phase 2 is hole transition to under the select gates SGD. The SGD erase then occurs at Phase 3 through Fowler-Nordheim tunneling bias application. These phases can be illustrated with respect to FIG. 13, FIGS. 15A and 15B, and FIG. 16.

Figures 13, 14:
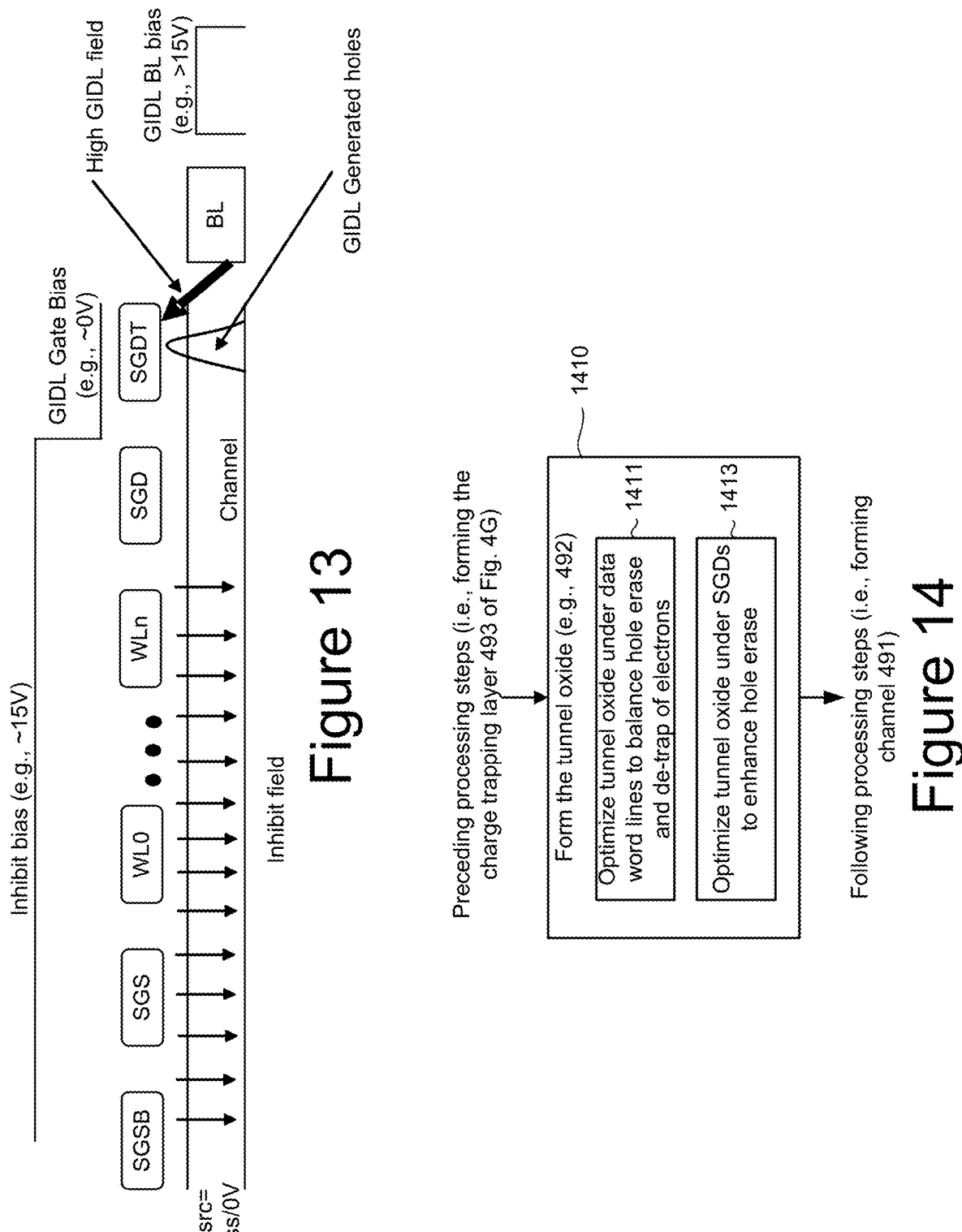
FIG. 13 is a schematic representation of gate induced drain leakage hole generation (GIDL) at the top drain select gates (SGDT) in the channel of a NAND string.
FIG. 14 illustrates the incorporation of the relative optimization of the tunnel oxide under the SGD region to favor hole injection relative to the optimization of the tunnel oxide under the data word lines to balance hole injection with electron de-trapping in the memory structure of FIGS. 4-4H.
Figures 15A, 15B:
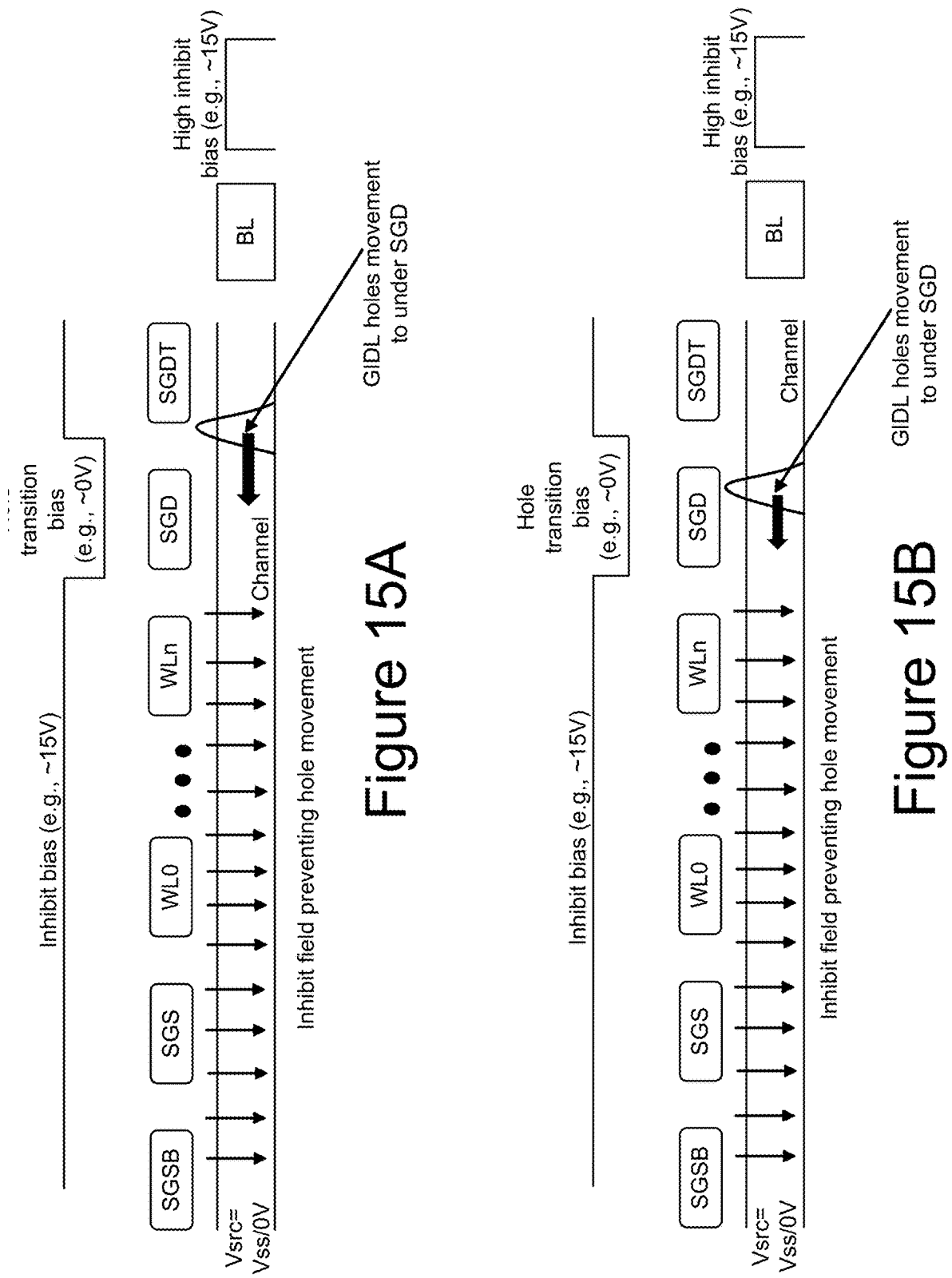
FIGS. 15A and 15B illustrate two stages of the second phase of the selective SGD erase of the hole transition to under the SGD region.
Figure 16:
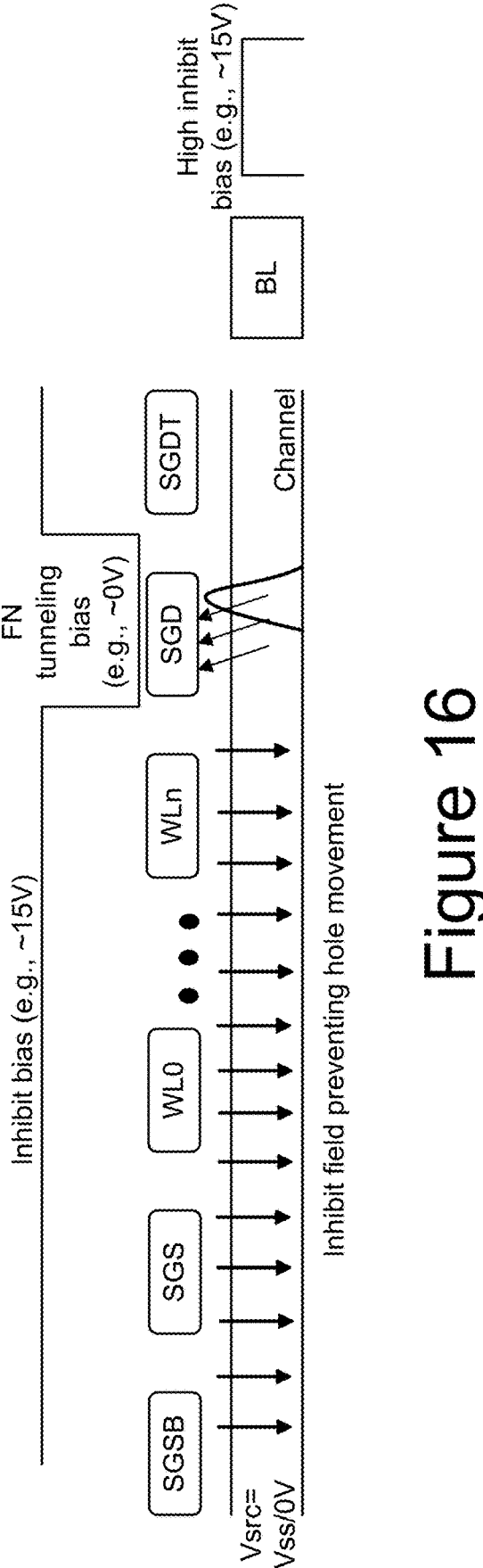
FIG. 16 illustrates the third phase of SGD erase through a Fowler-Nordheim tunneling bias application.

FIG. 13 is a schematic representation of GIDL at the top drain select gate (SGCT) in the channel of a NAND string. FIG. 13, and following FIGS. 15A-16, illustrate a NAND string with its channel running horizontally with the source side to the left and drain side to the right, similar to one of the memory holes of FIG. 4C rotated clockwise 90°. On the source end are shown a single bottom select gate SGSB and select gate SGS, with a single top select gate SGDT and select gate SGC shown on the drain side, where these can function as described above. Although only a single one of each of these gates is shown in FIG. 13 to simplify the discussion, depending on the embodiment, larger numbers of each can be included as in FIG. 4C. In between the select gates are the word lines WL0-WLn corresponding to the memory cells, where any dummy word lines are not explicitly shown. The channel runs under these gates/control lines and is connected on the drain side to the bit line BL. FIG. 13 also schematically represents some of the bias levels on the NAND string in the GIDL hole generation phase of SGD erase.

A typical erase of data word lines is a combination of electron discharge from the charge trapping layer (e.g., 493 of FIG. 4G) and hole injection from the substrate. The relative contributions of electron discharge versus hole injection can be tuned through appropriate band engineering. Hole injection causes more tunnel oxide (e.g., 492 of FIG. 4G) degradation compared to electron discharge so that, on the one hand, the processing is tuned so that the hole contribution is not so high that the NAND memory undergoes severe degradation per erase/program cycle due to hole injection and does not meet the endurance requirement of the memory (typically on the order of 100k cycles). On the other hand, the device is tuned such that the electron contribution is not so high such that it becomes very easy for electron discharge to cause a higher probability of data loss during data retention. Relative to data word lines, these constraints do not apply to the SGD erase band engineering as these select gates do not see the same field levels as data word lines during the erase program cycles. For this reason, the band engineering under the select gates can be independently tuned to achieve a more efficient erase and program of the SGD transistors. The embodiments presented here can use independent band engineering for the tunnel oxide under the gate of SGD to favor hole injection.

FIG. 14 illustrates the incorporation of the relative optimization of the tunnel oxide under the SGD region to favor hole injection relative to the optimization of the tunnel oxide under the data word lines to balance hole injection with electron de-trapping in the memory structure of FIGS. 4-4H. Referring to FIG. 4G, after preceding processing steps, including forming the memory holes 472 through the alternating dielectric and conducting layers and forming the charge trapping layer 493, in step 1410 the tunnel oxide 492 is formed. Under the data word lines, in the regions between the word lines and the channel, the tunnel oxide is optimized to balance the de-trapping of electrons and hole based erase in step 1411. Under the SGDs, the tunnel oxide is instead optimized to enhance hole based erase using the GIDL mechanism in step 1413.

More specifically, in processing the optimization usually primarily focusses on data word lines, where there is an optimization of the Nitrogen concentration in the SiON layer so that both strong hole erase is avoided (which causes too much SiON degradation) versus limit enhanced de-trap of electrons (which is the main cause for data retention for the data word lines). For SGD transistors in particular, there is no concern about strong hole erase induced degradation since SGD transistors will not undergo frequent erase/program cycles, unlike data word lines which may need to endure up to 100k of erase/program cycles. Consequently, relative to the data word lines, the N concentration of the SiON layer under the SGD region can be independently optimized as there is not the same concern about electron de-trap.

As illustrated in FIG. 13, the first phase of the SGD erase process begins with generation of holes through the GIDL operation, similar to the process described above. For this purpose, appropriate bias at the SGDT control line and bit line are applied so that the electric filed across the SGDT transistor and the bit line is strong enough to generate GIDL electron hole pair distribution. While generated electrons are swept to the bit line due to the applied bias condition, generated holes are pushed towards the SGD region. An appropriate inhibit bias is applied at the data word lines and other elements of the NAND string such that the filed under the elements prevents the holes from being injected to the data word lines and causing data erase. FIG. 13 illustrates some example values of these bias levels, where the GIDL bit line bias is >15V, the SGDT GIDL gate bias is ~0V, the source is at 0V, and the rest of the NAND string is at an inhibit bias of ~15V.

FIGS. 15A and 15B illustrate two stages of the second phase of the selective SGD erase for the hole transition to under the SGD region. This is achieved by applying an appropriate bias voltage level under the SGD region and an inhibit bias voltage level at the bit line, while the inhibit bias is applied to the rest of the NAND string, to cause the drift of the GIDL generated holes towards the SGD region. FIG. 15A illustrates an earlier stage of this drift of the hole distribution, followed by the later stage of FIG. 15B. FIGS.

15A and 15B illustrate an exemplary set of bias levels, with the SGD level lowered from the inhibit bias to a hole transition bias of ~0V, the SGDT bias level raised to the inhibit bias, the bit line taken to the high inhibit bias of ~15, while the rest of the NAND string is maintained at the inhibit bias and the source keep at or near ground. This will stop the hole generation through the GIDL mechanism, move the already generated holes under SGD, and inhibit them from moving further done the NAND string.

FIG. 16 illustrates the third phase of SGD erase through a Fowler-Nordheim tunneling bias application. In this phase, an appropriate set of bias conditions is applied to the SGD to cause the transitioned GIDL holes to tunnel through Fowler-Nordheim tunneling and recombine with the electrons in the charge trapping layer under the SGD control gate to lower the SGD threshold voltage. The SGD erase can be followed by an erase verify cycle, similar to a typical erase verify, but focused on the SGD transistors to check that their Vth level is lowered appropriately and, if not, the three phased of the SGD erase can repeated until the Vth of the SGD transistors are lowered to the desired voltage. FIG. 16 again illustrates a set of example bias conditions, where SGD is now biased at a Fowler-Nordheim tunneling bias level of, for example, ~0V. Note that, unlike the typical block erase operation wherein the GIDL erase happens through both source side and bit line side, here the GIDL erase occurs only on the bit line side and only on the selected sub-block or sub-blocks.

Following SGD erase, the SGD transistor can be refreshed by reprogramming. SGD programming can be performed similarly to the process described above with respect to the memory cells, except with the SGD control line in place of a selected word line. The programming will be a binary write with the verify level corresponding to the desired Vth value.

Figure 17:
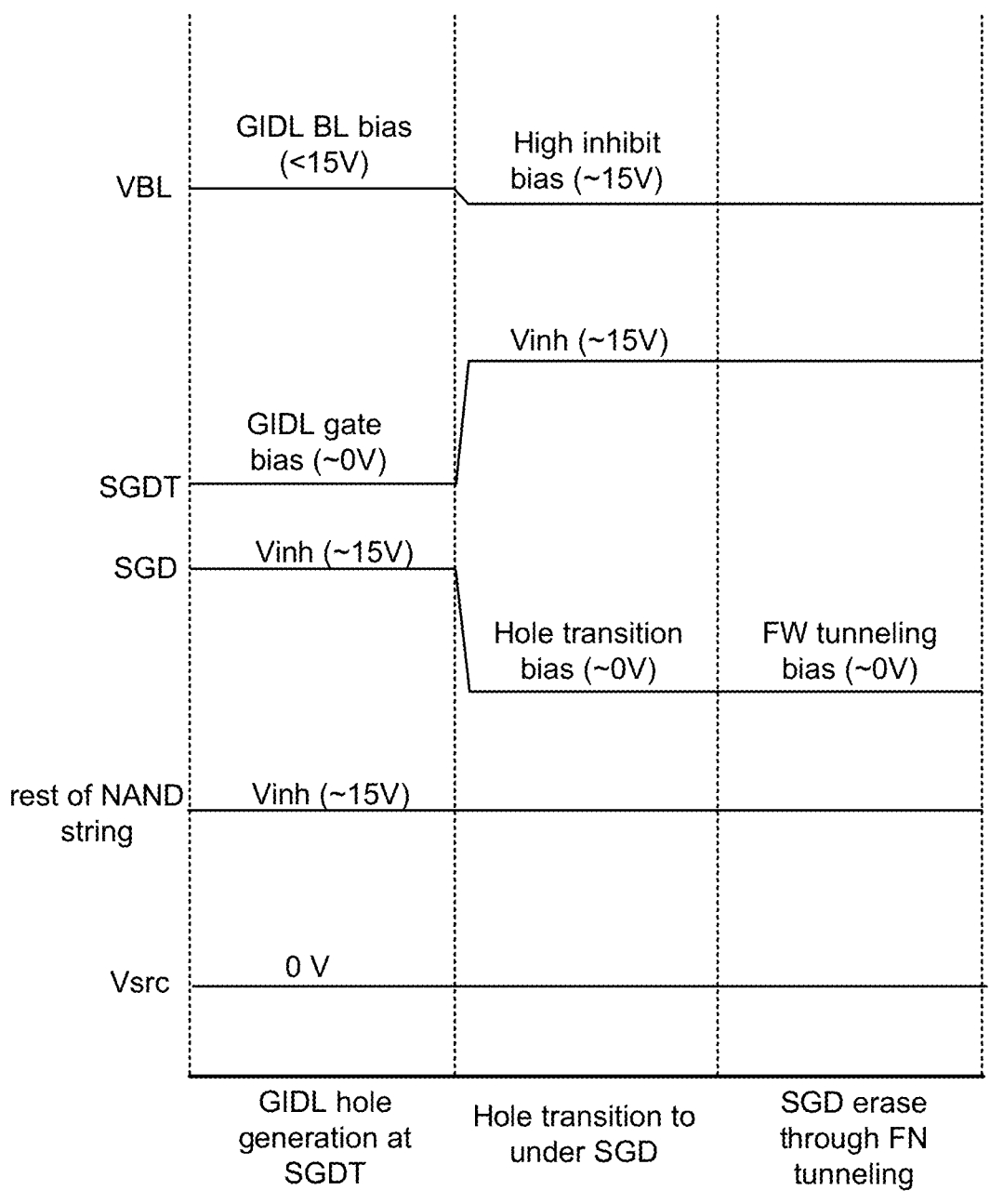
FIG. 17 is a set of waveforms to illustrate the bias levels during the three phases of the charge coupled erase scheme of FIGS. 13-16.

FIG. 17 is a set of waveforms to illustrate the bias levels during the three phases of the charge coupled erase scheme of FIGS. 13-16. In Phase 1, to generate holes at the SGDT through the GIDL mechanism, the bit line is at the high GIDL bit line bias voltage of, for example, over 15V while SGDT is at the low GIDL gate bias of ~0V. This will generate a distribution of holes in the SGDT region of the channel. SGD and the rest of the NAND string are at high inhibit voltage to localize this hole generation, with the source voltage Vsrc at ground, as it will be throughout the other phases. Once the holes are generated through the GIDL mechanism, in Phase 2 they are transitioned to under SGD by lowering SGD from the inhibit voltage Vinh to a low hole transition bias of ~0V while the SGDT level is raised to Vinh and the bit line voltage VBL is also set to a high inhibit bias of ~15. This shifts the holes to under SGD, while, by maintaining the rest of the NAND string at Vinh, a field is generated to prevent the holes from moving further down the NAND string. As the holes move to under SGD, the SGD erase through Fowler-Nordheim tunneling begins in Phase 3. In Phase 3, SGD is at a low Fowler-Nordheim tunneling voltage, which can be near or the same as the hole transition bias, such as ~0V, and that can induce the hole tunneling once they are under the SDG gate.

FIG. 18 is a flowchart for an embodiment for selective drain side select gate erasure through the GIDL based charge coupled scheme. Beginning at step 1800, a selective SGD erase is triggered, where this is selective in that the drain side select gate (or gates) of the NAND strings of a selected sub-block or blocks are erased without erasing the memory cells of the NAND strings. This can be triggered as part of a Vth refresh for the select gates, such as from a command generated on the memory controller 120 or from the host 102, or as part of a data encryption as generated from a host 102 and discussed in more detail in the following discussion.

Step 1810 corresponds to Phase 1, where the NAND string is biased to generate holes at the drain end of the NAND string at the SGDT region through the GIDL mechanism. As illustrated in FIGS. 13 and 17, this includes concurrently biasing the bit line to the high GIDL bit line bias at step 1811, biasing the top drain side select gate SGDT to the low GIDL gate bias level at step 1813, and, at step 1815, biasing the rest of the NAND string, including SGD to be erased, as the high inhibit voltage. The control circuitry for applying these bias levels can include the drivers and other elements of column control circuitry 210 and row control circuitry 220 under the directions of the system control logic 260 as it executes the selective SGD erase command sequence received at step 1800.

Step 1820 corresponds to Phases 2 and 3, in which the holes are transitioned to under the SGD control gate and then the selective SGD erase is performed through Fowler-Nordheim tunneling. As illustrated in FIGS. 15A-17, this includes concurrently raising the SGDT voltage to the high inhibit bias at step 1821 and lowering SGD voltage to a low value for the hole transition (Phase 2) and Fowler-Nordheim tunneling (Phase 3) at step 1823, where the rest of the NAND string is again maintained at the inhibit bias in step 1825 and the bit line taken to a high inhibit bias. The control circuitry for applying these bias levels can again include the drivers and other elements of column control circuitry 210 and row control circuitry 220 under the directions of the system control logic 260 as it executes the selective SGD erase command sequence received at step 1800.

Following step 1820, some embodiments can include an erase verify at step 1831 to see whether the erase selected SGD transistors have their Vth value in the desired range. This can be performed similarly to the standard memory cell erase verification using the sense amps 230 and other elements 210, 220, and 230 of the control circuitry. If an SGD does not erase verify, the flow can loop back to step 1810, unless a maximum loop number is included and exceeded. If the verify of step 1831 is passed, step 1833 determines whether the drain select gate is to be reprogrammed. If the erase was triggered as part of a select gate refresh at step 1800, then the reprogram follows at step 1837. If the erase was part of a data purge, as described next, the process may end at step 1835, although reprogram could occur at a later step 1837 as part of a data retrieval.

Some memory systems have specific requirements of secure erase and data corruption, or sanitation, before erasing the block so that, once erased, the data content will not be readable. The specific requirement from the system is typically that any read on that block must lead to an uncorrectable error correct code (UECC) result. The usual way to meet this requirement by performing what is known as "flash fill", which programs the entire block with a programming pulse that corrupts the existing data in the block, an approach the renders the data in the block permanently irretrievable. In further embodiments presented here, the selective SGD erase mechanism can instead provide a scheme to sanitize selected data content wherein any read would result in UECC, but also can make it possible to retrieve the data in case it is required to be retrieved at a later stage.

FIG. 19 is a flowchart of an embodiment for data purge and retrieval base on the drain side select gate selective erase mechanism. Beginning at step 1901 the control logic 260 for a memory die receives a command for a data purge of selected sub-blocks of a memory array. This can be generated by the firmware on the memory controller 120 in response to a secure erase command from a host 102 or in response to a standard erase in a system in which a data purge as part of the erase is a requirement. At step 1903, the control circuitry for the memory die with the selected sub-blocks performs a sub-block-wise or block-wise SGD erase sequence thorough the bit line GIDL charge coupled erase mechanism as described with respect to FIGS. 13-18. By erasing the drain side select gates, the erased sub-block will be corrupted so that any attempted read will result in a UECC result.

At step 1905 system control logic 260 subsequently receives a command for a retrieval of the data of selected sub-blocks that had be previously purged. This command can be generated by the firmware on the memory controller 120 in response to a special access restore command from a host 102 that will trigger a data recovery sequence. In response, at step 1907 the control circuitry for the memory array begins a programming sequence to program the corresponding SGD transistors as described above with respect to step 1837 of FIG. 18. The NAND memory can then resume normal operation at step 1909, including normal read operations for the data purged and then retrieved in step 1907.

Consequently, as described above, the selective drain side select gate erase through the GIDL mechanism enables sub-block level SGD erase without the requirement that the block's data is also erase. Although described with respect to SGD erase, the technique can also be extended to single word line erase by placing a selected, single word line in the role of the SGD transistor and placing the SGD transistors and any word lines to the drain side of the selected word line in the role of the SGDT transistor in the three phase GIDL based erase. The technique also enables "temporary" data encryption through SGD erase which helps in encryption of data when the firmware triggers it due to extraneous circumstances (e.g., a host command) and also enables data recovery when the firmware triggers it due to the removal of extraneous circumstance.

One embodiment includes a non-volatile memory system, comprising a control circuit configured to connect to an array of non-volatile memory cells including a first NAND string having a plurality of memory cells connected in series between a corresponding bit line and a source line, each of the memory cells connected along a correspond word line, the first NAND string connected to the corresponding bit line through a first select gate having a programmable threshold voltage in series with a second select gate, the second select gate connected between the first select gate and the corresponding bit line. The control circuit is configured to: bias the corresponding word lines of memory cells of the first NAND string to an erase inhibit voltage; and, while biasing the corresponding word lines of memory cells of the first NAND string to the erase inhibit voltage, erase the first select gate while maintaining previously programmed data content of the memory cells of the first NAND string. To erase the first select gate the control circuit is configured to: bias the first select gate to the erase inhibit voltage; while biasing the first select gate to the erase inhibit voltage, concurrently bias the corresponding bit line to a high voltage and the second select gate to a low voltage; and subsequent to concurrently biasing the corresponding bit line to a high voltage and the second select gate to a low voltage, concurrently bias the first select gate to a low voltage and the second select gate to the erase inhibit voltage.

One embodiment includes a method comprising: receiving a command to encrypt data content of a plurality of selected NAND strings of an array of non-volatile memory cells including the plurality of selected NAND strings, each of the selected NAND strings comprising a plurality of memory cells connected in series to a corresponding bit line through a corresponding first select gate; and, in response to the command to encrypt the data content of the plurality of selected NAND strings, erasing the corresponding first select gate of each of the selected NAND strings to have an unreadable error correction code result while not erasing data content of the memory cells of the selected NAND strings.

One embodiment includes a non-volatile memory system, comprising: an array of non-volatile memory cells having a NAND architecture and comprising a plurality of blocks, each of the blocks comprising a plurality of NAND strings, and each of the NAND strings comprising a plurality of memory cells connected in series to a corresponding bit line through corresponding series connected first and second select gates, where the first select gate is programmable and is connected to the corresponding bit line through the second select gate; and one or more control circuits connected to the array of non-volatile memory cells and configured to selectively erase the first select gate of a plurality of selected NAND strings while not erasing the memory cells of the selected NAND strings, where, to selectively erase the first select gate of the plurality of selected NAND strings. The one or more control circuits are configured to: generate a distribution of holes in a channel region below the second select gate of each of the selected NAND strings; and subsequent to generating the distribution of holes in the channel region below the second select gate of each of the selected NAND strings, transition the distribution of holes to a channel region under the first select gate of each of the selected NAND strings and erase the first select gate of each of the selected NAND strings by tunneling the distribution holes to a charge storage region under the first select gate of each of the selected NAND strings.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via one or more intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory system, comprising:
a control circuit configured to connect to an array of non-volatile memory cells including a first NAND string having a plurality of memory cells connected in series between a corresponding bit line and a source line, each of the memory cells connected along a correspond word line, the first NAND string connected to the corresponding bit line through a first select gate having a programmable threshold voltage in series with a second select gate, the second select gate connected between the first select gate and the corresponding bit line, the control circuit configured to:
bias the corresponding word lines of memory cells of the first NAND string to an erase inhibit voltage; and
while biasing the corresponding word lines of memory cells of the first NAND string to the erase inhibit voltage, erase the first select gate while maintaining previously programmed data content of the memory cells of the first NAND string, where, to erase the first select gate the control circuit is configured to:
bias the first select gate to the erase inhibit voltage;
while biasing the first select gate to the erase inhibit voltage, concurrently bias the corresponding bit line to a high voltage and the second select gate to a low voltage; and
subsequent to concurrently biasing the corresponding bit line to a high voltage and the second select gate to a low voltage, concurrently bias the first select gate to a low voltage and the second select gate to the erase inhibit voltage.

2. The non-volatile memory system of claim 1, wherein the array is on a first die and the control circuit is on a second die, separate from and bonded to the first die.

3. The non-volatile memory system of claim 1, wherein the control circuit is further configured to:
subsequent to erasing the first select gate, reprogram the first select gate while maintaining the previously programmed data content of the memory cells of the first NAND string.

4. The non-volatile memory system of claim 1, wherein the control circuit is further configured to:
receive a command to encrypt the previously programmed data content of the first NAND string; and
erase the first select gate while maintaining the previously programmed data content of the memory cells of the first NAND string in response to the command to encrypt the programmed data content of the first NAND string.

5. The non-volatile memory system of claim 1, wherein the array of non-volatile memory cells comprises a plurality of blocks and each of the blocks comprise a plurality of sub-blocks, wherein the first NAND string belongs to a first sub-block comprising a plurality of NAND strings, and wherein the control circuit is further configured to:
concurrently with erasing the first select gate while maintaining the previously programmed data content of the memory cells of the first NAND string, erase a first select gate of other NAND strings of the first sub-block while maintaining previously programmed data content of the memory cells of the other NAND strings of the first sub-block.

6. The non-volatile memory system of claim 1, further comprising the array and each of the memory cells and first select gate of the first NAND string comprise a corresponding control gate, wherein the first NAND string further comprises:
a channel region extending along the first NAND string under the memory cells and first select gate thereof;
a charge storage region extending along the first NAND string between the channel region and the control gates of the memory cells and the first select gate; and
a tunneling oxide layer between the channel region and the charge storage region, wherein the tunneling oxide layer under the first select gate of the first NAND string is formed to enhance the tunneling of holes relative to the tunneling oxide layer under the control gates of the memory cells of the first NAND string.

7. A method, comprising:
receiving a command to encrypt data content of a plurality of selected NAND strings of an array of non-volatile memory cells including the plurality of selected NAND strings, each of the selected NAND strings comprising a plurality of memory cells connected in series to a corresponding bit line through a corresponding first select gate;
in response to the command to encrypt the data content of the plurality of selected NAND strings, erasing the corresponding first select gate of each of the selected NAND strings to have an unreadable error correction code result while not erasing data content of the memory cells of the selected NAND strings;
subsequent to erasing the corresponding first select gate of each of the selected NAND strings to have the unreadable error correction code result, receiving a command to retrieve the data content of the plurality of selected NAND strings; and
in response to receiving the command to retrieve the data content of the plurality of selected NAND strings, programming the first select gate of each of the selected NAND strings.

8. The method of claim 7, wherein the array of non-volatile memory cells comprises a plurality of blocks and each of the blocks comprise a plurality of sub-blocks, and wherein the plurality of selected NAND strings correspond to a sub-block.

9. The method of claim 7, wherein erasing the corresponding first select gate of each of the selected NAND strings while not erasing data content of the memory cells of the selected NAND strings further comprises:
biasing the memory cells of the selected NAND string to an erase inhibit voltage; and
while biasing the memory cells of the selected NAND string to the erase inhibit voltage, erasing the first select gate of each of the selected NAND strings through a gate induced drain leakage mechanism.

10. The method of claim 9, wherein each of the selected NAND strings further includes a corresponding second select gate through which the corresponding first select gate is connected to the corresponding bit line, wherein erasing the corresponding first select gate of each of the selected NAND strings through the gate induced drain leakage mechanism further comprises:
while biasing the corresponding first select gate to the erase inhibit voltage, concurrently biasing the corresponding bit line to a high voltage while biasing the corresponding second select gate to a first low voltage; and subsequent to concurrently biasing the corresponding bit line to the high voltage while biasing the corresponding second select gate to the first low voltage, concurrently biasing the corresponding second select gate to the erase inhibit voltage while biasing the corresponding first select gate to a low voltage.

11. The method of claim 7, wherein erasing the corresponding first select gate of each of the selected NAND further comprises:

performing a first erase operation on the first select gate of each of the selected NAND strings;

subsequent to performing a first erase operation, erase verifying the corresponding first select gates of the selected NAND strings; and in response to the corresponding first select gates of the selected NAND strings not erase verifying, performing a second erase operation on the corresponding first select gate of each of the selected NAND strings.

12. A non-volatile memory system, comprising:

an array of non-volatile memory cells having a NAND architecture and comprising a plurality of blocks, each of the blocks comprising a plurality of NAND strings, and each of the NAND strings comprising a plurality of memory cells connected in series to a corresponding bit line through corresponding series connected first and second select gates, where the first select gate is programmable and is connected to the corresponding bit line through the second select gate; and one or more control circuits connected to the array of non-volatile memory cells and configured to selectively erase the first select gate of a plurality of selected NAND strings while not erasing the memory cells of the selected NAND strings, where, to selectively erase the first select gate of the plurality of selected NAND strings, the one or more control circuits are configured to:

generate a distribution of holes in a channel region below the second select gate of each of the selected NAND strings; and subsequent to generating the distribution of holes in the channel region below the second select gate of each of the selected NAND strings, transition the distribution of holes to a channel region under the first select gate of each of the selected NAND strings and erase the first select gate of each of the selected NAND strings by tunneling the distribution holes to a charge storage region under the first select gate of each of the selected NAND strings.

13. The non-volatile memory system of claim 12, wherein to not erase the memory cells of the selected NAND strings while selectively erasing the first select gate of the plurality of selected NAND strings, the one or more control circuits are further configured to:

bias the memory cells of the selected NAND strings to an erase inhibit voltage.

14. The non-volatile memory system of claim 12, wherein, to generate the distribution of holes in a channel region below the second select gate of each of the selected NAND strings, the one or more control circuits are further configured to:

concurrently bias the corresponding bit line to a high voltage while biasing the second select gate to a low voltage.

15. The non-volatile memory system of claim 12, wherein, to transition the distribution of holes to the channel region under the first select gate of each of the selected NAND strings, the one or more control circuits are further configured to:

concurrently bias the corresponding second select gate to an erase inhibit voltage while biasing the corresponding first select gate to a low voltage.

16. The non-volatile memory system of claim 12, wherein, to erase the first select gate of each of the selected NAND strings by tunneling the distribution holes to a charge storage region under the first select gate of each of the selected NAND strings, the one or more control circuits are further configured to:

concurrently bias the corresponding second select gate to an erase inhibit voltage while biasing the corresponding first select gate to induce Fowler-Nordheim tunneling.

17. The non-volatile memory system of claim 12, wherein, to erase the first select gate of each of the selected NAND strings by tunneling the distribution holes to a charge storage region under the first select gate of each of the selected NAND strings, the one or more control circuits are further configured to:

perform a first erase operation of the first select gate of each of the selected NAND strings;

perform an erase verify of the first select gates of the selected NAND strings; and in response to the first select gates of the selected NAND strings not passing the erase verify, perform a second erase operation of the first select gate of each of the selected NAND strings.

18. The non-volatile memory system of claim 12, wherein the one or more control circuits are further configured to:

subsequent to selectively erasing the first select gate of the plurality of selected NAND strings, reprogramming the first select gate of the plurality of selected NAND strings.

19. The non-volatile memory system of claim 12, wherein the channel region and the charge storage region extend under the memory cells of each of the NAND strings are a separated by a tunneling oxide layer, and wherein the tunneling oxide layer under the first select gate of each of the NAND strings is formed to enhance the tunneling of holes relative to the tunneling oxide layer under the memory cells of each of the NAND strings.

20. The non-volatile memory system of claim 12, wherein the array of non-volatile memory cells is on a first die and the one or more control circuits are on a second die, separate from and bonded to the first die.

* * * * *